United States Patent
Tanaka et al.

(10) Patent No.: US 7,416,322 B2
(45) Date of Patent: Aug. 26, 2008

(54) VEHICLE LIGHTING DEVICE

(75) Inventors: Hidetada Tanaka, Shizuoka (JP); Motohiro Komatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 50 days.

(21) Appl. No.: 11/282,679

(22) Filed: Nov. 21, 2005

(65) Prior Publication Data

US 2006/0109669 A1    May 25, 2006

(30) Foreign Application Priority Data

Nov. 24, 2004  (JP) ............ P.2004-338663

(51) Int. Cl.
*F21V 7/00* (2006.01)
(52) U.S. Cl. ............ 362/514; 362/516; 362/288; 362/300; 362/360; 362/545
(58) Field of Classification Search ............ None
See application file for complete search history.

(56) References Cited

U.S. PATENT DOCUMENTS

| | | | | |
|---|---|---|---|---|
| 4,587,601 A | * | 5/1986 | Collins | ............ 362/235 |
| 5,678,916 A | * | 10/1997 | Watanabe et al. | ............ 362/465 |
| 5,941,633 A | * | 8/1999 | Saito et al. | ............ 362/543 |
| 6,334,701 B2 | * | 1/2002 | Kodaira et al. | ............ 362/475 |
| 6,565,247 B2 | * | 5/2003 | Thominet | ............ 362/545 |
| 6,575,609 B2 | * | 6/2003 | Taniuchi et al. | ............ 362/517 |
| 6,601,980 B2 | * | 8/2003 | Kobayashi et al. | ............ 362/510 |
| 2005/0036331 A1 | * | 2/2005 | Crepeau et al. | ............ 362/516 |

FOREIGN PATENT DOCUMENTS

JP    2001-283616 A    10/2001

* cited by examiner

*Primary Examiner*—Sandra O'Shea
*Assistant Examiner*—Danielle Dunn
(74) *Attorney, Agent, or Firm*—Sughrue Mion, PLLC

(57) ABSTRACT

A vehicle light emitting device including a light emitting element, a primary reflector, and a secondary reflector. A reflecting surface of the primary reflector has a shape of a substantially dome-shaped body of revolution formed by rotating about the optical axis Ax an ellipse E which has a primary focal point F1 which is a point near the light emitting element and a secondary focal point F2 which is a point near the reflecting surface. The primary reflector includes a belt-shaped region, which straddles a ring-shaped locus of the secondary focal point F2 and is configured as a light translucent portion, whereby reflected light from the primary reflector is caused to temporarily converge on the secondary focal point F2 in each cross-section of the body of revolution including the optical axis Ax and is thereafter caused to be incident on the secondary reflector as a diffused light.

6 Claims, 17 Drawing Sheets

VEHICLE LIGHTING DEVICE

This application claims foreign priority from Japanese Patent Application No. 2004-338663, filed Nov. 24, 2004, the entire disclosure of which is herein incorporated by reference.

BACKGROUND OF THE INVENTION

1. Field of the Invention

The present invention relates to a vehicle lighting device including a light emitting element, such as a light emitting diode, as a light source.

2. Description of Related Art

In recent years, lighting devices, which use as light sources light emitting elements, such as light emitting diodes, have been developed for use in vehicle lighting devices such as headlamps.

In relation to the development of these lighting devices, Japanese Patent Publication No. 2001-283616 describes a vehicle lighting device including a primary reflector which reflects light from a light emitting element disposed on an optical axis extending in a longitudinal direction of the lighting device in such a manner as to be directed towards the front of the lighting device towards the rear of the lighting device and a secondary reflector which reflects the light from the light emitting element that is reflected on the primary reflector towards the front of the lighting device. In the vehicle lighting device described in JP-A-2001-283616, the shape of a reflecting surface of the primary reflector is the shape of an ellipsoid of revolution, which takes a light emitting center of the light emitting element as a primary focal point and a point positioned forwards of the primary focal point on the optical axis as a secondary focal point.

While the utilization factor of bundles of rays of light from the light emitting element can be enhanced by adopting the vehicle lighting device described in the aforesaid JP-A-2001-283616, in the vehicle lighting device so described, there is a problem that light emitted from this vehicle lighting device cannot be accurately controlled since not only the light from the light emitting element that is reflected on the primary reflector, but also direct light from the light emitting element, are designed to be incident on the secondary reflector.

The invention was made in view of this situation, and an object thereof is to provide a vehicle lighting device including a light emitting element as a light source which can enhance the utilization factor of a bundle of rays of light from the light emitting element and also accurately control light emitted therefrom.

SUMMARY OF THE INVENTION

The invention is such as to attain the object by devising the shape of a reflecting surface of a primary reflector of a configuration in which a vehicle lighting device includes both primary and secondary reflectors.

Namely, according to the invention, there is provided a vehicle lighting device including a light emitting element disposed on an optical axis extending in a longitudinal direction of the lighting device in such a manner as to be directed to the front of the lighting device, a primary reflector for reflecting light from the light emitting element towards the rear of the lighting device, and a secondary reflector for reflecting the light from the light emitting element that is reflected on the first reflector to the front of the lighting device. A reflecting surface of the primary reflector has the shape of a substantially dome-shaped body of revolution that is formed by rotating an ellipse having a primary focal point which is a point lying near the light emitting element and a secondary focal point which is a point lying near the reflecting surface about the optical axis. In the primary reflector, a belt-shaped region, which straddles a ring-shaped locus resulting when the secondary focal point is rotated about the optical axis, is made into a light translucent portion.

There is no specific limitation on the types of the vehicle lighting device, and hence, the invention can be applied to, for example, a headlamp, a fog lamp, a cornering lamp, a daytime running lamp or a lamp unit making up part thereof.

The light emitting element can include a light emitting chip which illuminates substantially in a dot. However, there is no specific limitation on the type thereof, and hence, for example, light emitting diodes and laser diodes can be adopted.

While the primary reflector is configured so as to reflect light from the light emitting element towards the rear of the lighting device, there is no specific limitation on the configuration of the reflecting surface thereof including size, curvature and the like, provided that the reflecting surface is such as to be formed to have the shape of a substantially dome-shaped body of revolution that is formed by rotating an ellipse having a primary focal point which is a point lying near the light emitting element and a secondary focal point which is a point lying near the reflecting surface about the optical axis.

There is no specific limitation on the position of the secondary focal point, provided that the point constituting the secondary focal point lies near the reflecting surface. Here, the point near the reflecting surface means any of a point on the reflecting surface, a point which is slightly spaced apart from the reflecting surface in a direction normal thereto, a point which is slightly spaced apart from an end portion of the reflecting surface on a plane extended from the reflecting surface and a point which is slightly spaced apart from an end portion of the reflecting surface on a plane extended from the reflecting surface and is also slightly spaced apart from the extended plane in a direction normal thereof.

There is no specific limitation on the size, the shape of the reflecting surface and the like of the secondary reflector, provided that the secondary reflector is designed to reflect the light, from the light emitting element that is reflected on the primary reflector, towards the front of the lighting device.

There is no specific limitation on the configuration of the light translucent portion, provided that the light translucent portion is configured so as not to block the light from the light emitting element that is reflected on the primary reflector. As to the term of "translucent" in this invention, it is noted that said term shall be construed rather broadly such as to cover the meaning of "transparent" whose optical characteristic might be included in the definition of "translucent" that is known for a person skilled in the art.

BRIEF DESCRIPTION OF THE DRAWINGS

The advantages, nature and various additional features of the invention will appear more fully upon consideration of the exemplary embodiment of the invention and modifications thereof which are schematically set forth in the drawings, in which.

DETAILED DESCRIPTION OF THE EXEMPLARY EMBODIMENT

Although the invention will be described below with reference to an exemplary embodiment and modifications thereof, the following exemplary embodiment and modifications do not restrict the invention. The exemplary embodiment of the invention will be described using the accompanying drawings.

Figure 1:
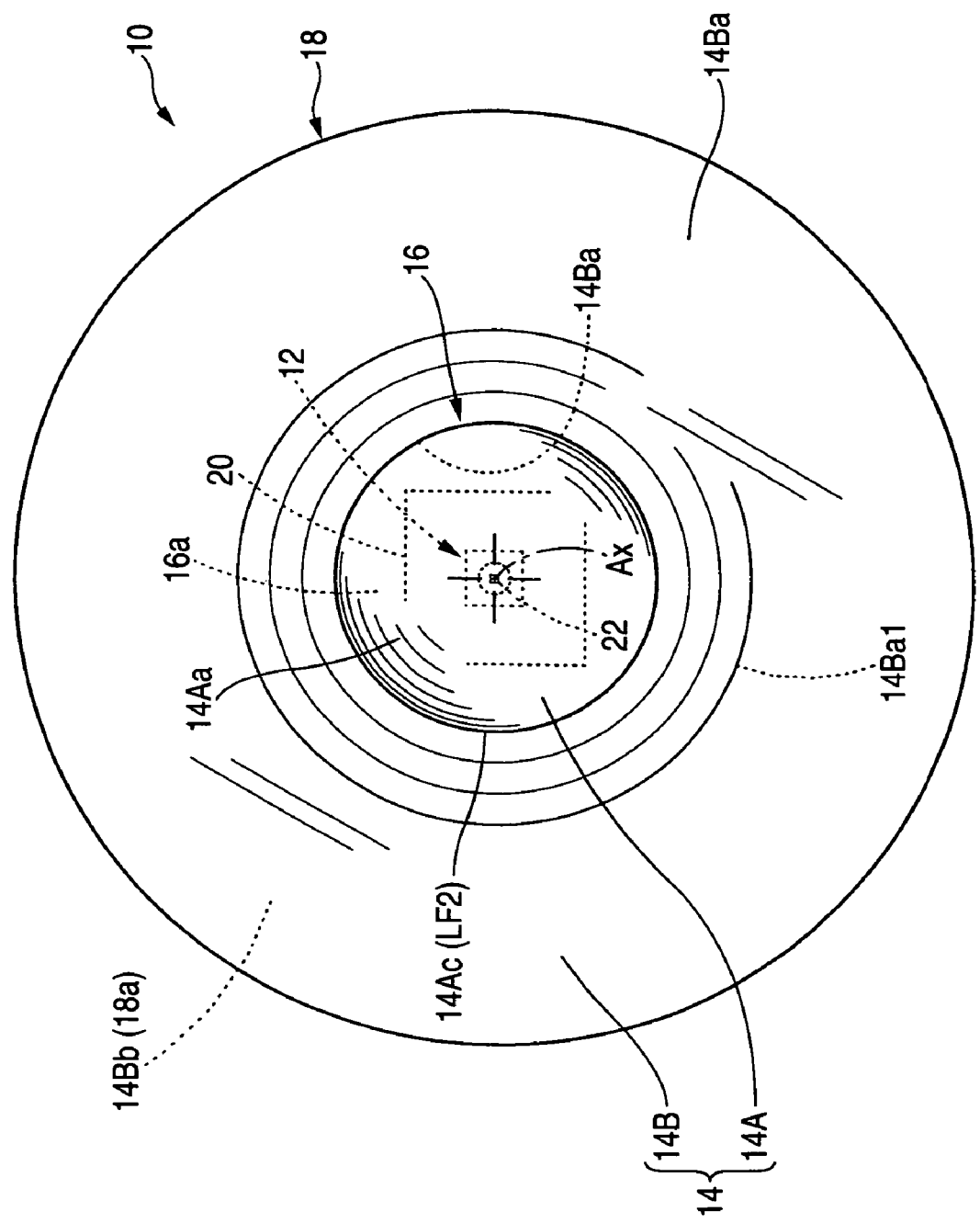
FIG. 1 is a front view which shows a vehicle lighting device according to an exemplary embodiment of the invention.
Figure 2:
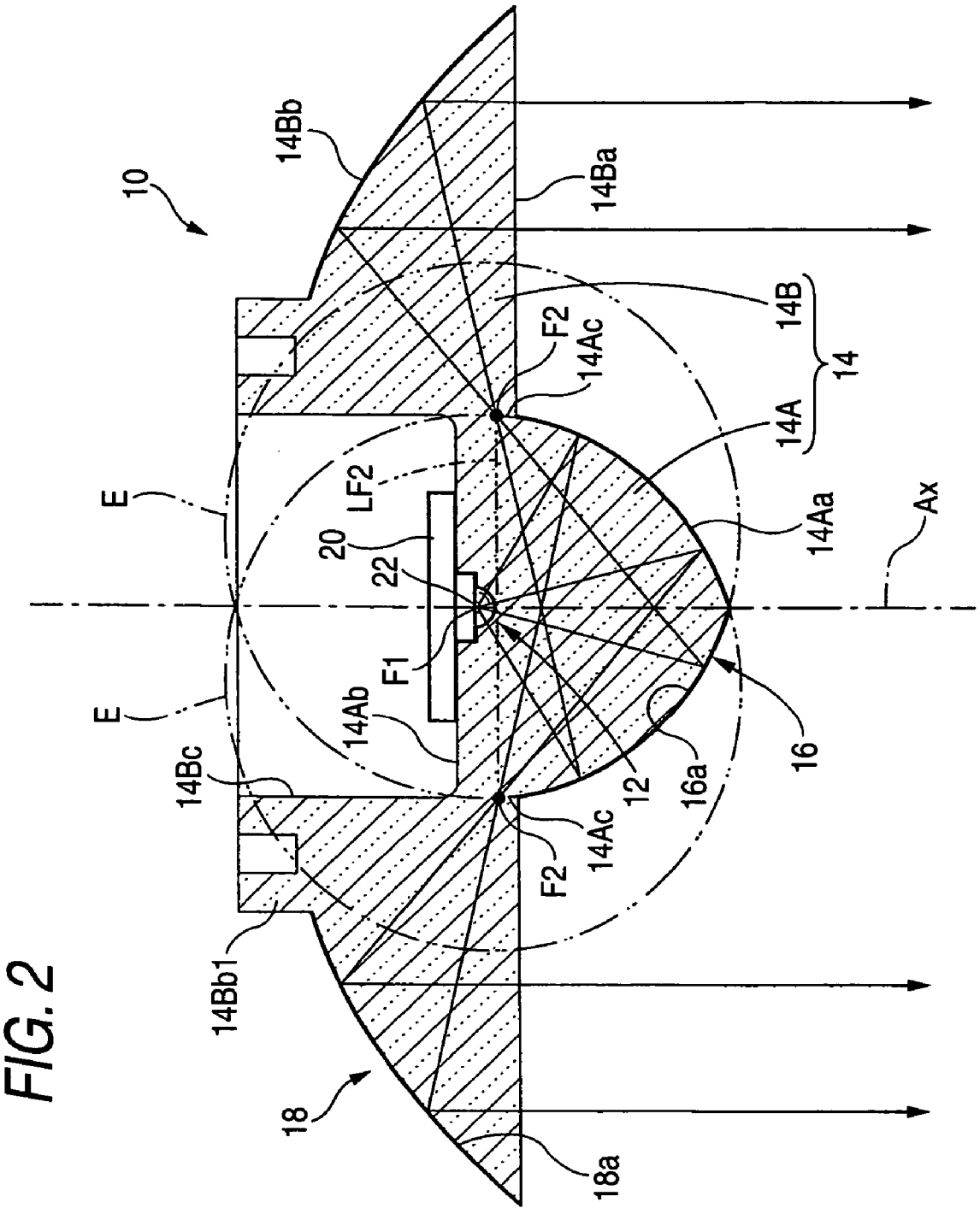
FIG. 2 is a top sectional view which shows the vehicle lighting device.
Figure 3:
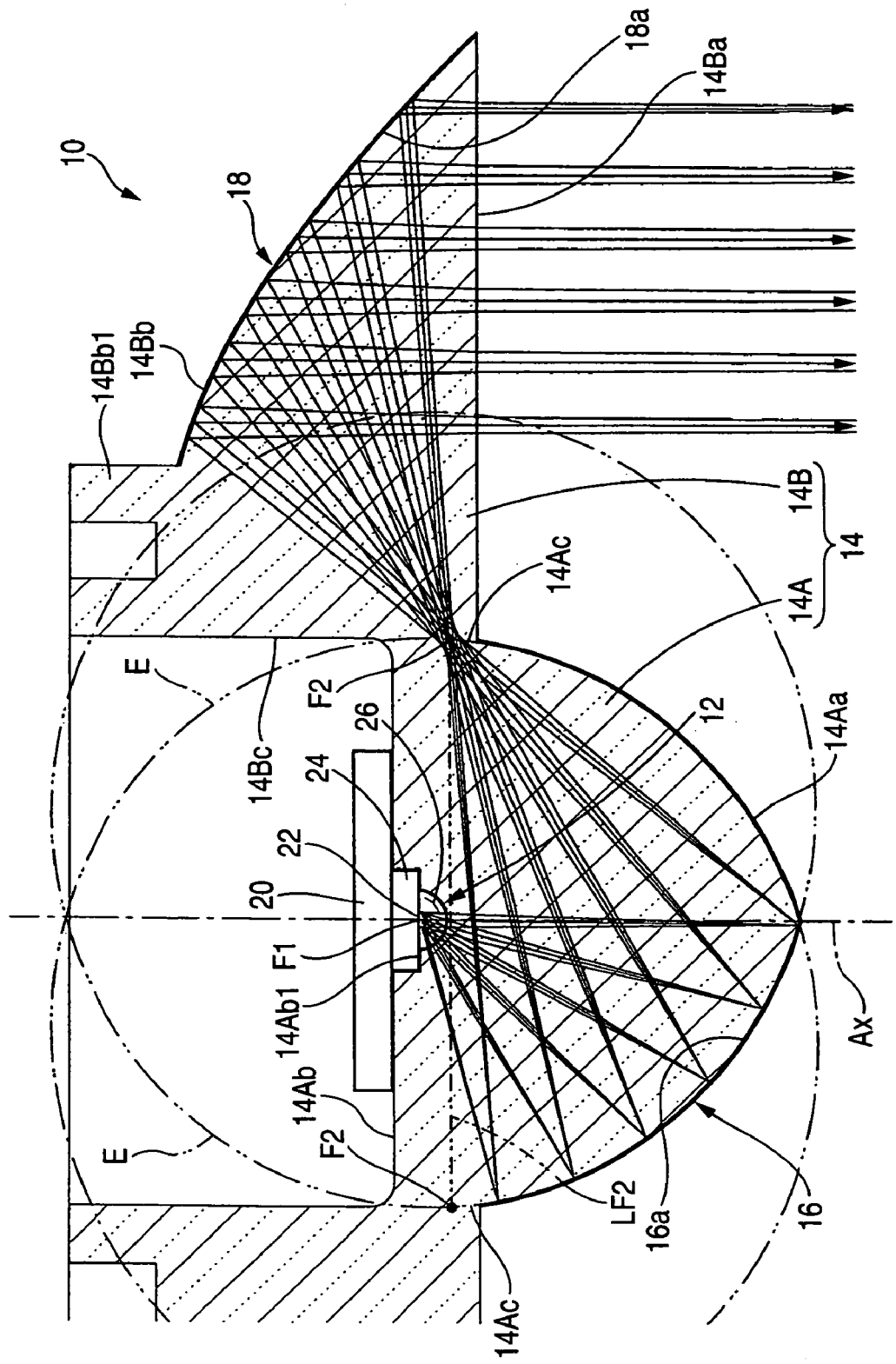
FIG. 3 is a drawing which shows in detail a main part of FIG. 2.
Figure 4:
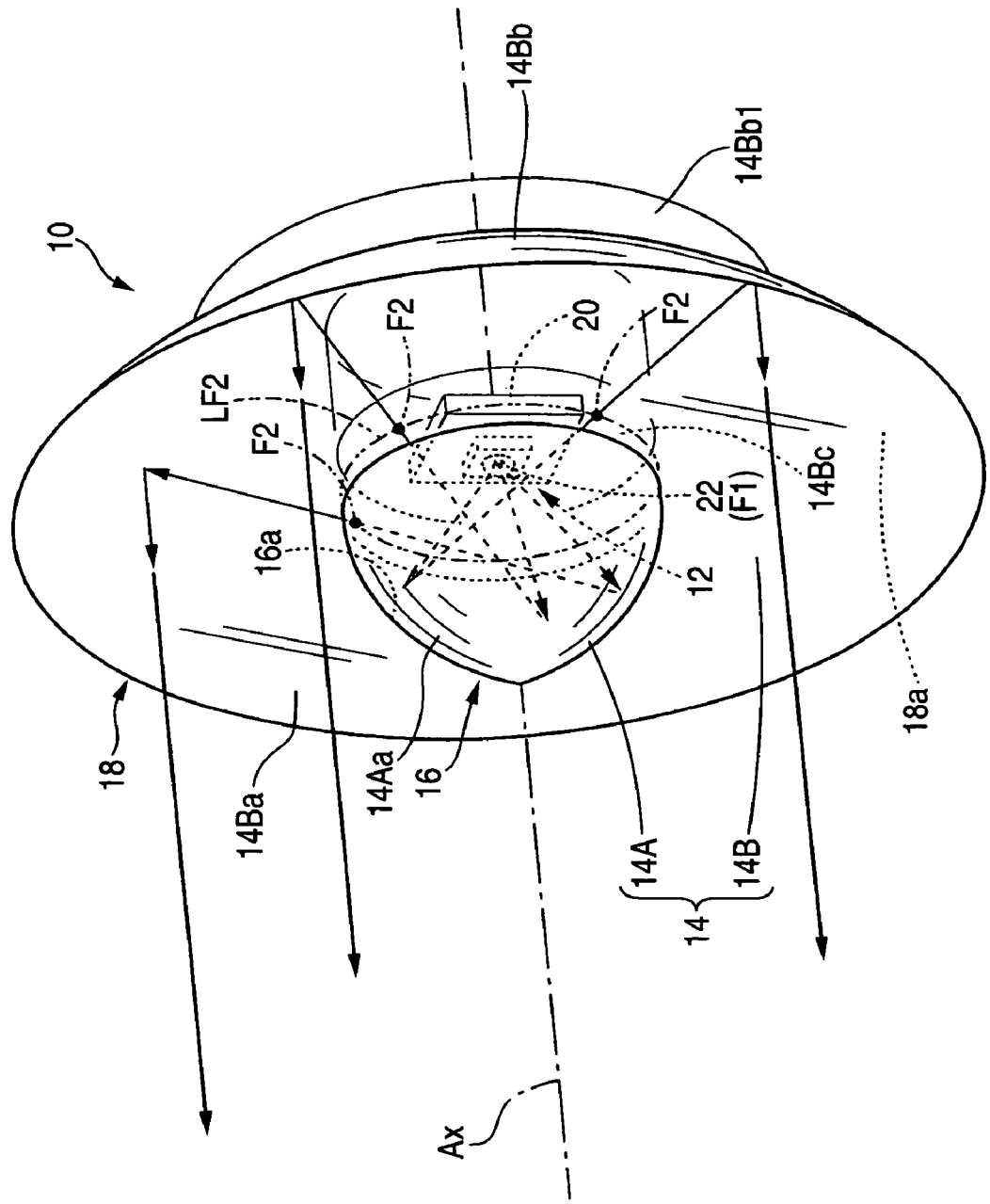
FIG. 4 is a perspective view which shows the vehicle lighting device.

FIGS. 1 and 2 are, respectively, a front view and a top sectional view which show a vehicle lighting device 10 according to the embodiment of the invention, and FIG. 3 is a drawing which shows in detail a main part in FIG. 2. In addition, FIG. 4 is a perspective view which shows the vehicle lighting device.

As shown in these figures, the vehicle lighting device 10 is a lamp unit that is incorporated as part of a headlamp and includes a light emitting element 12 disposed to direct light toward the front of the lighting device 10. A light emitting center of the light emitting element is positioned on an optical axis Ax that extends in a longitudinal direction of the lighting device and a light translucent block 14, which fixedly supports the light emitting element 12. When incorporated in the headlamp, this vehicle lighting device 10 is disposed with the optical axis Ax thereof extending in a longitudinal direction of a vehicle.

The light emitting element 12 is a white light emitting diode. The light emitting element 12 includes a light emitting chip 22 having a size of about 0.3 to 3 mm$^2$, a base member 24 on which the light emitting chip 22 is installed, and a substantially semi-spherical resin seal member 26. The light emitting element 12 is fixed to the light translucent block 14 via a support plate 20.

The light translucent block 14 is a transparent resin block-shaped member. The light translucent block 14 is made up of a central block 14A situated on the optical axis Ax and a circumferential edge block 14B which surrounds the central block 14A. The central block 14A and the circumferential edge block 14B are formed integrally with each other.

The central block 14A has on a front surface 14Aa thereof the shape of a substantially dome-shaped body of revolution formed by rotating about the optical axis Ax an ellipse E having a primary focal point F1, which is the light emitting center of the light emitting chip 22, and a secondary focal point F2, which is a point lying to a side of the primary focal point F1 and slightly further forward than the primary focal point F1. As this rotation occurs, a distance between the secondary focal point F2 and the primary focal point F1 is set such that the secondary focal point F2 is situated on the ellipse E. A rear end edge of the front surface 14Aa of the central block 14A is situated slightly further forward with respect to the secondary focal point F2.

A rear surface 14Ab of the central block 14A is configured as a light source mounting surface on which the light emitting element 12 is mounted. Namely, the rear surface 14Ab is made up of a vertical surface, which intersects with the optical axis Ax at right angles, and a recess portion 14Ab1, which is formed on the rear surface 14Ab at a position on the optical axis Ax in such a manner as to follow a front surface shape of the light emitting element 12. The light emitting element 12 is designed to be fixed to the rear surface 14Ab via a support plate 20 when the light emitting element is inserted in the recess portion 14Ab1.

This central block 14A functions as a primary reflector 16 which reflects light from the light emitting element 12 towards the rear of the lighting device. Namely, a planishing treatment is applied over the whole area of the front surface 14Aa of the central block 14A by virtue of aluminum deposition or the like, whereby a reflecting surface 16a is formed. The reflecting surface 16a reflects light from the light emitting element 12 towards the rear of the lighting device. Since this reflecting surface 16a has the shape of a body of revolution of which a defining curve is the ellipse E, which adopts the light emitting element 12 as the primary focal point F1, light from the light emitting element 12 that is reflected on the reflecting surface 16a temporarily converges on the secondary focal point F2 of the ellipse E in each cross-section of the body of revolution including the optical axis Ax.

This central block 14A is connected to the circumferential edge block 14B at a belt-shaped region which straddles a ring-shaped locus LF2. The ring-shaped locus LF2 is formed by the secondary focal points F2 of the ellipse E that is rotated about the optical axis Ax. This belt-shaped region is a light translucent portion 14Ac.

On the other hand, a front surface 14Ba of the circumferential edge block 14B is made up of a vertical surface which intersects with the optical axis Ax at right angles. An inner circumferential edge of the front surface 14Ba coincides with the position of the rear end edge of the front surface 14Aa of the central block 14A.

A rear surface 14Bb of the circumferential edge block 14B has the shape of a body of revolution formed by rotating about the optical axis Ax a parabola which adopts the secondary focal point F2 of the ellipse E as a focal point. The axis of this parabola is parallel to the optical axis Ax.

An inner circumferential surface 14Bc of the circumferential edge block 14B is made up of a cylindrical surface formed by rotating the axis of the parabola about the optical axis Ax. The circumferential edge block 14B is connected to the rear surface 14Ab of the central block 14A at a front end portion of the inner circumferential surface 14Bc. In addition, an annular flange portion 14Bb1 with a groove is formed on an inner circumferential end portion of the rear surface 14Bb of the circumferential edge block 14B in such a manner as to protrude rearwards.

This circumferential edge block 14B functions as a secondary reflector 18, which reflects light from the light emitting element 12 that is reflected on the primary reflector 16. The light is reflected by the secondary reflector 18 towards the front of the lighting device.

Namely, the planishing treatment is applied by virtue of aluminum deposition or the like over the whole area of the rear surface 14Bb of the circumferential edge block 14B, except the annular flange portion 14Bb1. Accordingly, a reflecting surface 18a is formed. The reflecting surface 18a reflects light, which has been emitted from the light emitting element 12 and has been reflected on the reflecting surface 16a of the primary reflector 16, towards the front of the lighting device. As this occurs, since the reflecting surface 18a has the shape of a body of revolution of which a defining curve is the parabola which adopts the secondary focal point F2 of the ellipse E as a focal point and light emitted from the light emitting element 12 that is reflected on the reflecting surface 16a of the primary reflector 16 is caused to temporarily converge on the secondary focal point F2 within each cross-section of the body of revolution including the optical axis Ax; reflected light from the reflecting surface 18a of the secondary reflector 18 becomes light that is parallel to the optical axis Ax. Then, this parallel reflected light travels straight through the front surface 14Ba of the circumferential edge block 14B, which is made up of the vertical plane that intersects with the optical axis Ax at right angles and then emerges to the front of the lighting device as parallel light from the front surface 14Ba.

As shown in FIG. 3, the light emitting chip 22, while it is small, has a certain size. Therefore, light from respective positions of the light emitting chip 22 that is reflected on the reflecting surface 16a of the primary reflector 16 is incident on the reflecting surface 18a of the secondary reflector 18 as a bundle of rays, which spreads to some extent relative to light from the light emitting center thereof. Then, the bundle of rays that is reflected on the reflecting surface 18a of the secondary reflector 18 becomes a bundle of rays, which is caused to converge slightly relative to light from the light emitting center of the light emitting chip 22. A bundle of rays that emerges from the front surface 14Ba of the circumferential edge block 14B becomes something like a parallel bundle of rays by virtue of the refracting action occurring at the front surface 14Ba.

Figure 5:
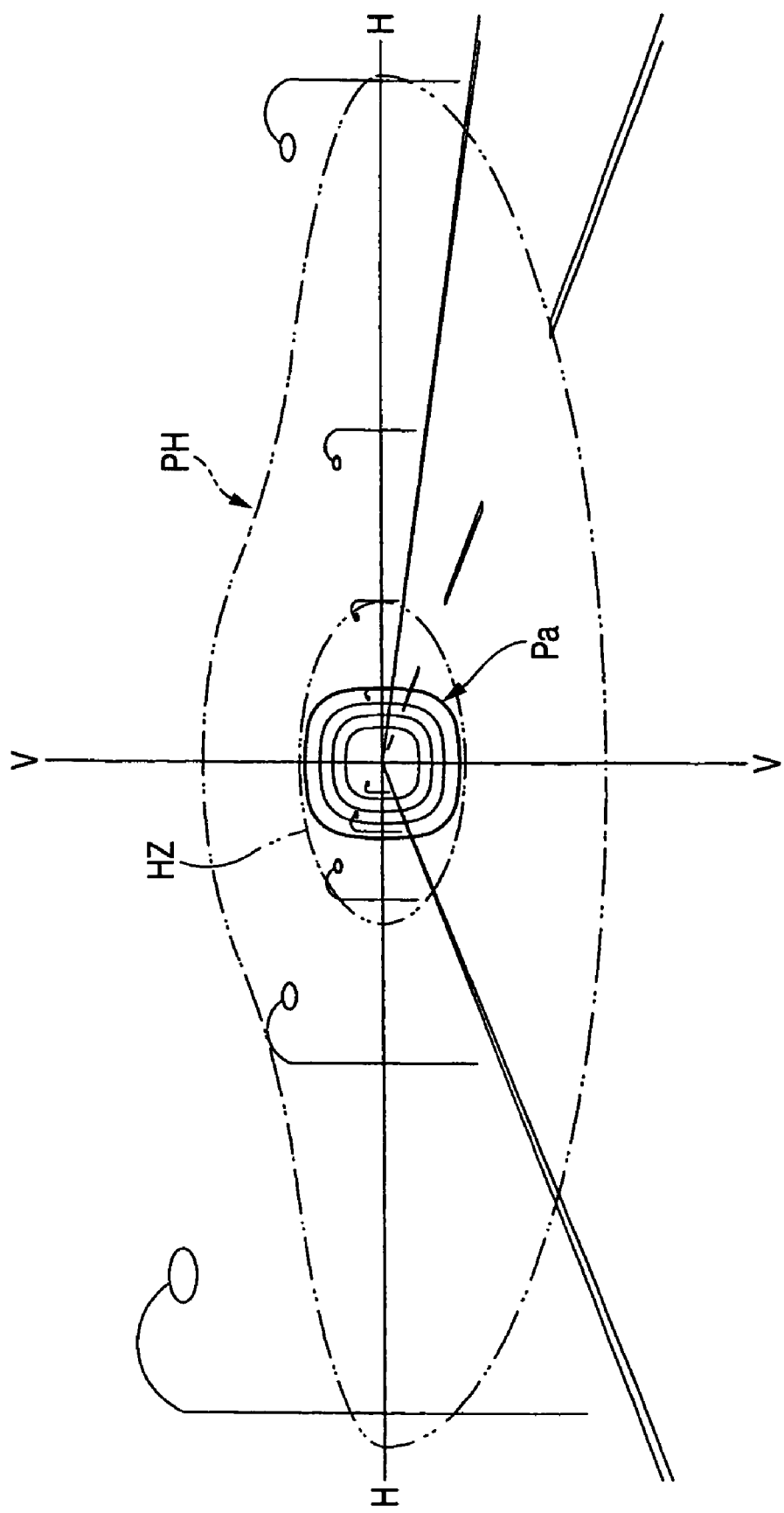
FIG. 5 is a perspective view of a light distribution pattern that is to be formed on an imaginary vertical screen disposed 25 m ahead of the vehicle by light emitted forwards from the vehicle lighting device.

FIG. 5 is a perspective view of a light distribution pattern that is to be formed on an imaginary vertical screen disposed 25 m ahead of the vehicle by light emitted forwards from the vehicle lighting device 10.

As shown in the figure, this light distribution pattern Pa is designed to be formed as part of a upper beam light distribution pattern PH indicated by a chain double-dashed line in the same figure.

This upper beam light distribution pattern is a light distribution light pattern that is formed by light emitted from the whole of a headlamp incorporating therein the vehicle lighting device 10 and which is formed into a transversely elongated light distribution pattern which spreads to the left and right of the headlamp from an H-V point which is a vanishing point in a forward direction of the vehicle, and an area in the vicinity of the H-V point is formed as a hot zone HZ which is a high luminous intensity zone.

On the other hand, the light distribution pattern Pa is a spot-shaped light distribution pattern that is formed around the H-V point. This is because a bundle of rays emitted forwards from the vehicle lighting device 10 is made up of a bundle of rays which is substantially in parallel with the optical axis Ax. In addition, this light distribution pattern Pa has a rounded, substantially square external shape. This is because the external shape of the light emitting chip 22 is set to a square.

Since this is formed into a spot shape around the H-V point, the light distribution pattern Pa becomes suitable for formation of the hot zone HZ for the upper beam light distribution pattern PH.

Note that in this light distribution pattern Pa, a plurality of curves which are formed substantially concentrically with a curve indicating the outline thereof are curves of equal luminous intensity and indicates that the light distribution pattern Pa becomes gradually brighter from an outer circumferential edge towards a center thereof (this will be true also in the following descriptions).

As has been described in detail heretofore, while the vehicle lighting device 10 according to the embodiment includes the light emitting element 12 disposed on the optical axis Ax extending in the longitudinal direction of the lighting device in such a manner as to be directed to the front of the lighting device, the primary reflector 16 for reflecting light from the light emitting element 12 towards the rear of the lighting device, and the secondary reflector 18 for reflecting the light from the light emitting element 12 that is reflected on the primary reflector 16 to the front of the lighting device; since the reflecting surface 16a of the primary reflector 16 has the shape of a substantially dome-shaped body of revolution, which is formed by rotating the ellipse E having the primary focal point F1 that is the point lying near the light emitting element 12 and the secondary focal point F2 that is the point lying near the reflecting surface 16a about the optical axis Ax and in the primary reflector 16, the belt-shaped region which straddles the ring-shaped locus LF2 resulting when the secondary focal point F2 is rotated about the optical axis is made into the light translucent portion 14Ac, the following function and advantage can be obtained.

Namely, since the reflecting surface 16a of the primary reflector 16 has the shape of a substantially dome-shaped body of revolution, which is formed by revolving the ellipse E having the primary focal point F1 that is the point lying near the light emitting element 12 and the secondary focal point F2 that is the point lying near the reflecting surface 16a about the optical axis Ax, the light from the light emitting element 12 that is reflected on the reflecting surface 16a temporarily converges on the secondary focal point F2 in each cross-section of the body of revolution including the optical axis Ax and thereafter is incident on the secondary reflector 18 as a diffused light from the secondary focal point F2. Then, the control of light emitted from the vehicle lighting device 10 can be implemented with good accuracy by reflecting the incident light towards the front of the lighting device using the secondary reflector 18.

As this occurs, since the light translucent portion 14Ac is provided on the primary reflector 16, the reflecting surface 16a of the primary reflector 16 does not extend to the light translucent portion 14Ac, and the ring-shaped locus LF2 of the secondary focal point F2 lies near the reflecting surface 16a of the primary reflector 16; the required width of the belt-shaped region which makes up the light translucent portion 14Ac can be suppressed to a minimum level. Accordingly, any reduction in area of the reflecting surface 16a of the primary reflector 16 caused by the light translucent portion 14Ac can be suppressed to a minimum level.

Thus, according to the exemplary embodiment, in the vehicle lighting device 10 which adopts the light emitting element 12 as its light source, in addition to enhancing the utilization factor of a bundle of rays of light from the light emitting element 12, the control of light emitted therefrom can be implemented with good accuracy.

As this occurs, since the primary reflector 16 is made up of the central block 14A of the light translucent block 14 of which the front surface 14Aa is made into the reflecting surface 16a, so that light from the light emitting element 12 that is incident on the central block 14A is internally reflected on the reflecting surface 16a; the support of the light emitting element 12 can be enabled by the central block 14A. Then, since the accuracy of the positional relationship between the light emitting element 12 and the reflecting surface 16a of the primary reflector 16 can be enhanced by this configuration, the control light emitted from the vehicle lighting device 10 can be implemented with better accuracy.

In addition, since the secondary reflector 18 is formed integrally with the central block 14A, which makes up the primary reflector 16, as the circumferential edge block 14B of the light translucent block 14, the accuracy of the positional relationship between the reflecting surface 18a of the secondary reflector 18 and the reflecting surface 16a of the primary reflector 16 and the light emitting element 12 can be enhanced. Accordingly, the control light emitted from the vehicle lighting device 10 can be implemented with better accuracy. As this occurs, since the ring-shaped locus LF2 of the secondary focal point F2 lies within the light translucent block 14, light from the light emitting element 12 that is reflected on the primary reflector 16 can be made to travel straight as far as the reflecting surface 18a of the secondary reflector 18 without being refracted on the light translucent portion at the light translucent portion 14Ac. Accordingly, control of the reflected light by the secondary reflector 18 can be facilitated, thereby making it possible to implement the control of light emitted from the vehicle lighting device 10 with much better accuracy.

In the exemplary embodiment, the reflecting surface 18a of the secondary reflector 18 has the shape of the body of revolution formed by rotating about the optical axis Ax the parabola which adopts the secondary focal point F2 of the ellipse E as the focal point and the axis parallel to the optical axis Ax as the axis thereof, light from the light emitting element 12 that is reflected on the reflecting surface 16a of the primary reflector 16 can be made to be reflected as light that is in parallel with the optical axis Ax by the reflecting surface 18a of the secondary reflector 18, whereby the light so reflected can then be caused to emerge from the front surface 14Ba of the circumferential edge block 14B to the front of the lighting device as it is. As this occurs, since while the bundle of rays from the respective positions of the light emitting chip 22 that is reflected on the reflecting surface 18a of the secondary reflector 18 becomes the bundle of rays which is caused to converge slightly relative to light from the light emitting center of the light emitting chip 22, the bundle of rays which emerges from the front surface 14Ba of the circumferential edge block 14B becomes something like the parallel bundle of rays by virtue of the refracting action occurring at the front surface 14Ba, the light distribution pattern Pa can be made into the spot-shaped light distribution pattern which is sufficiently small, whereby the light distribution pattern Pa can be made suitable for formation of the hot zone HZ for the upper beam light distribution pattern PH.

Additionally, in this embodiment, since the secondary focal point F2 is set at the position which is to the side of and slightly further forwards than the primary focal point F1, the following function and advantage can be obtained.

Namely, while it is difficult to implement with good accuracy the reflection control on direct light traveling from the light emitting element 12 towards the light translucent portion 14Ac by the secondary reflector 18, since the light emitting element 12 is disposed on the optical axis Ax in such a manner as to be directed to the front of the lighting device, the light distribution of emerging light from the light emitting chip 22 is such that the luminous intensity is highest at forward positions along the optical axis and gradually lowers as an angle at which light diverges from the optical axis Ax increases. Consequently, the quantity of direct light traveling from the light emitting element 12 towards the light translucent portion 14Ac can be suppressed to a minimum level by setting the secondary focal point F2 at the position near the side of the primary focal point F1 as in the case with the embodiment, whereby not only can the utilization factor of a bundle of rays of light from the light emitting element 12 be enhanced but also the generation of light which constitutes a problem in implementing the control of light emitted from the light emitting element 12 can be suppressed to a minimum level.

Note that while in the embodiment, the light emitting chip 22 of the light emitting element 12 is described as being formed into the square having the size of about 0.3 to 3 mm$^2$, light emitting chips formed into other external shapes (for example, a transversely elongated rectangular shape) can be used, whereby light distribution patterns having different sizes and shapes from those of the light distribution pattern Pa can be formed according to sizes and shapes of light emitting chips so used.

Next, modifications to the aforesaid exemplary embodiment will be described.

Firstly, a first modification to the exemplary embodiment will be described.

Figure 6:
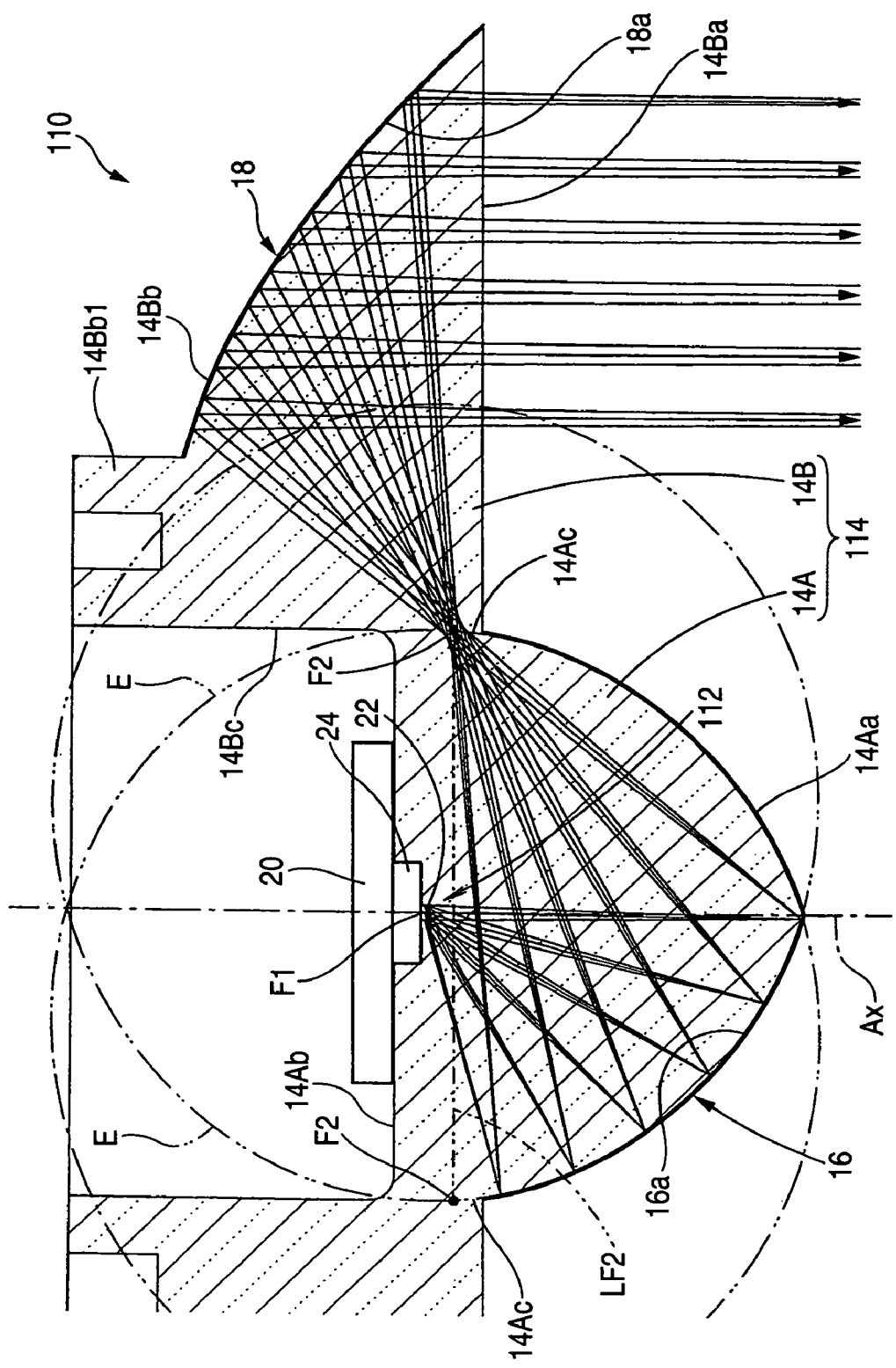
FIG. 6 is a drawing similar to FIG. 3 which shows a vehicle lighting device according to a first modification to the embodiment.

FIG. 6 is a similar drawing to FIG. 3 which shows a vehicle lighting device 110 according to the first modification.

As shown in the figure, while this vehicle lighting device 110 is similar to the exemplary embodiment in that the vehicle lighting device 110 also includes a light emitting element 112 and a light translucent block 114, this modification is different from the exemplary embodiment in that the light emitting element 112 of the modification does not include the resin seal member 26 for sealing off the light emitting chip 22, which is included in the aforesaid embodiment. Hence, the light emitting chip 22 is configured so as to be sealed off directly by the light translucent block 114.

Even in the event that the configuration according to this modification is adopted, the control of light emitted from the vehicle lighting device 110 can be implemented with good accuracy on top of enhancing the utilization factor of a bundle of rays of light from the light emitting element 112.

In addition, by adopting the configuration in which the light emitting chip 22 is directly sealed off by the light translucent block 114, the light translucent block 114 is allowed to double as the resin seal, whereby not only can the configuration of the vehicle lighting device 110 be simplified but also the loss of a bundle of rays by virtue of reflection at the interface can be eliminated.

Next, a second modification to the exemplary embodiment will be described.

Figure 7:
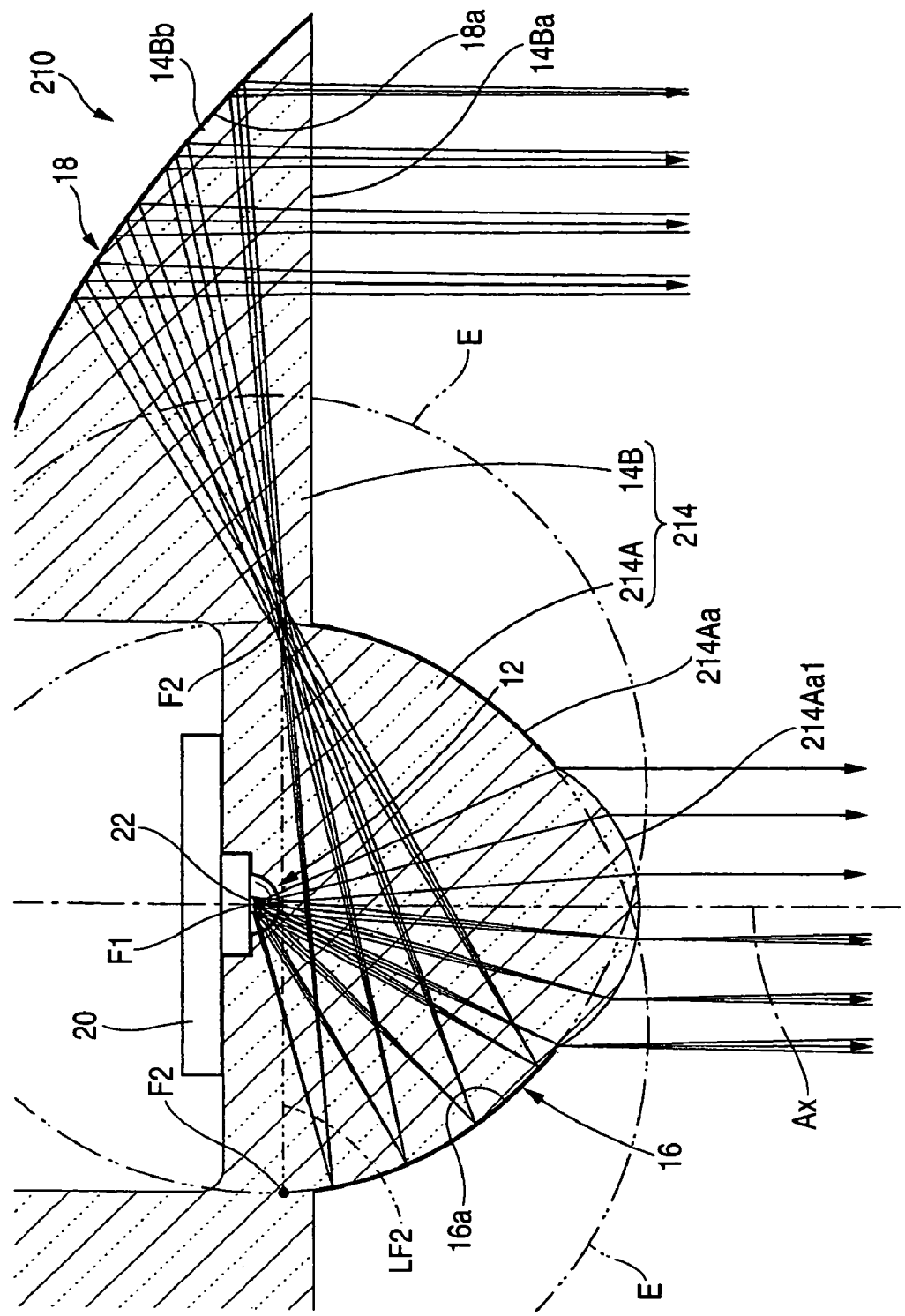
FIG. 7 is a drawing similar to FIG. 3 which shows a vehicle lighting device according to a second modification to the embodiment.

FIG. 7 is a drawing similar to FIG. 3 which shows a vehicle lighting device 210 according to the second modification.

As shown in the figure, while this vehicle lighting device 210 is similar to the aforesaid exemplary embodiment in that the vehicle lighting device 210 also includes a light emitting element 12 and a light translucent block 214, the light translucent block 214 of the second modification is different from the exemplary embodiment in that the configuration of a central block 214A thereof is different from that of the exemplary embodiment.

Namely, in the central block 214A of the modification, no planishing treatment is applied to a front surface 214Aa thereof at a region having a predetermined range (for example, a region inwards of a circular cone having a primary focal point F1 as its vertex and a center angle on one side of on the order of 20 to 30°) centered at the optical axis Ax. Instead, this region is configured as a direct light emitting surface 214Aa1 from which light from the light emitting element 12 that is incident on the central block 214A is emitted directly towards the front of the lighting device. As this occurs, the shape of a surface of this direct light emitting surface 214Aa1 is set substantially to the shape of an elliptic sphere, whereby light from the light emitting element 12 can be emitted in parallel with the optical axis Ax.

In addition, due to the direct light emitting surface 214Aa1 being formed, a reflecting surface 16a of a primary reflector 16 lacks the region having the predetermined range centered at the optical axis Ax.

Figure 8:
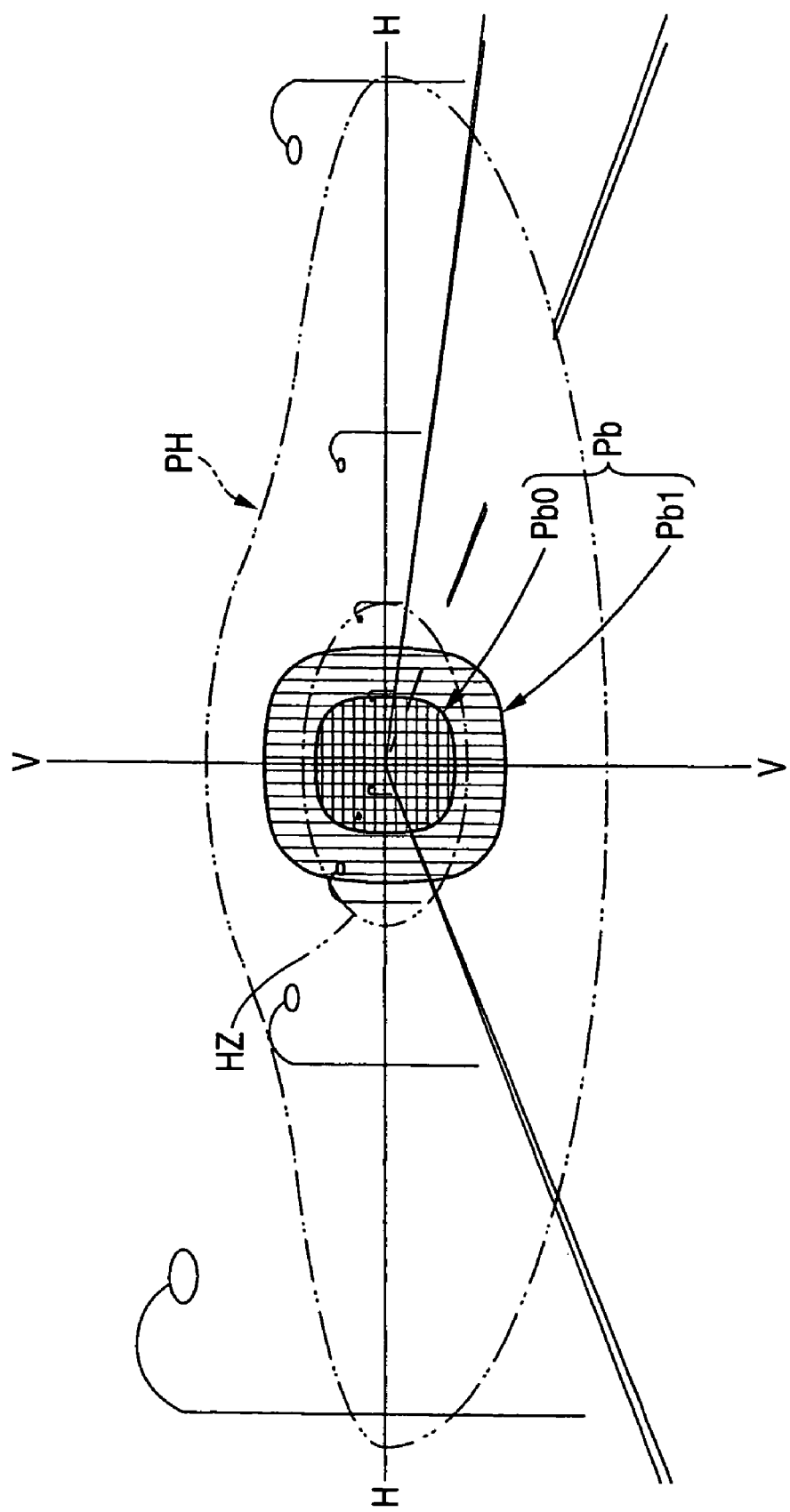
FIG. 8 is a perspective view which shows a light distribution pattern that is to be formed on the imaginary vertical screen by light emitted forwards from the vehicle lighting device according to the second modification.

FIG. 8 is a perspective view which shows a light distribution pattern Pb that is to be formed on the imaginary vertical screen disposed 25 m ahead of the vehicle by light emitted forwards from the vehicle lighting device 210.

As shown in the same figure, this light distribution pattern Pb is designed to be formed as part of a upper beam light distribution pattern PH indicated by a chain double-dashed line in the figure.

This light distribution pattern Pb is a spot-shaped light distribution pattern that is formed around an H-V point as a center and is formed as a composite light distribution pattern of a light distribution pattern Pb0 and a light distribution pattern Pb1.

The light distribution pattern Pb0 is a light distribution pattern formed by light from the light emitting element 12 that is emitted to the front of the lighting device from a front surface 14Ba of a circumferential block 14B by way of the reflecting surface 16a of the primary reflector 16 and a reflecting surface 18a of a secondary reflector 18 and has a rounded, substantially square external shape, and the light distribution so formed constitutes a light distribution pattern which is slightly smaller than the light distribution pattern Pa of the aforesaid exemplary embodiment. This is because part (that is, a part corresponding to the direct light emitting surface 214Aa1) of the reflecting surface 16a of the primary reflector 16 is missing and hence, there is no light incident on a region on the reflecting surface 18a of the secondary reflector 18 which is situated closer to an inner circumferential edge thereof.

On the other hand, the light distribution pattern Pb1 is a light distribution pattern that is to be formed by light from the light emitting element 12 that is emitted directly from the direct light emitting surface 214Aa1 of the central block 214A to the front of the lighting device and has a rounded, substantially square external shape, and the light distribution pattern so formed constitutes a light distribution pattern that is larger to some extent than the light distribution pattern Pa of the aforesaid embodiment. This is because the light distribution pattern Pb1 is formed by direct light.

Since this also constitutes a spot-shaped light distribution pattern, the light distribution pattern Pb is suitable to form a hot zone HZ for the upper beam light distribution pattern PH.

Also in the event that the configuration of the second modification is adopted, the control of light emitted from the vehicle lighting device 210 can be implemented with good accuracy on top of enhancing the utilization factor of a bundle of rays of light from the light translucent device 12.

In addition, as in the case with this modification, since the optical length for light emitted from the direct light emitting surface 214Aa1 within the light translucent block 214 can be shortened by making the region on the front surface 214Aa of the central block 214A which has the predetermined range centered at the optical axis Ax as the direct light emitting surface 214Aa1, the light absorption by the light translucent block 214 can be suppressed to a minimum level, thereby making it possible to enhance further the utilization factor of a bundle of rays of light from the light translucent device 12.

Note that it is, of course, possible to set the shape of the surface of the direct light emitting surface 214Aa1 to a different surface shape from that of this second modification.

Next, a third modification to the aforesaid exemplary embodiment will be described.

Figure 9:
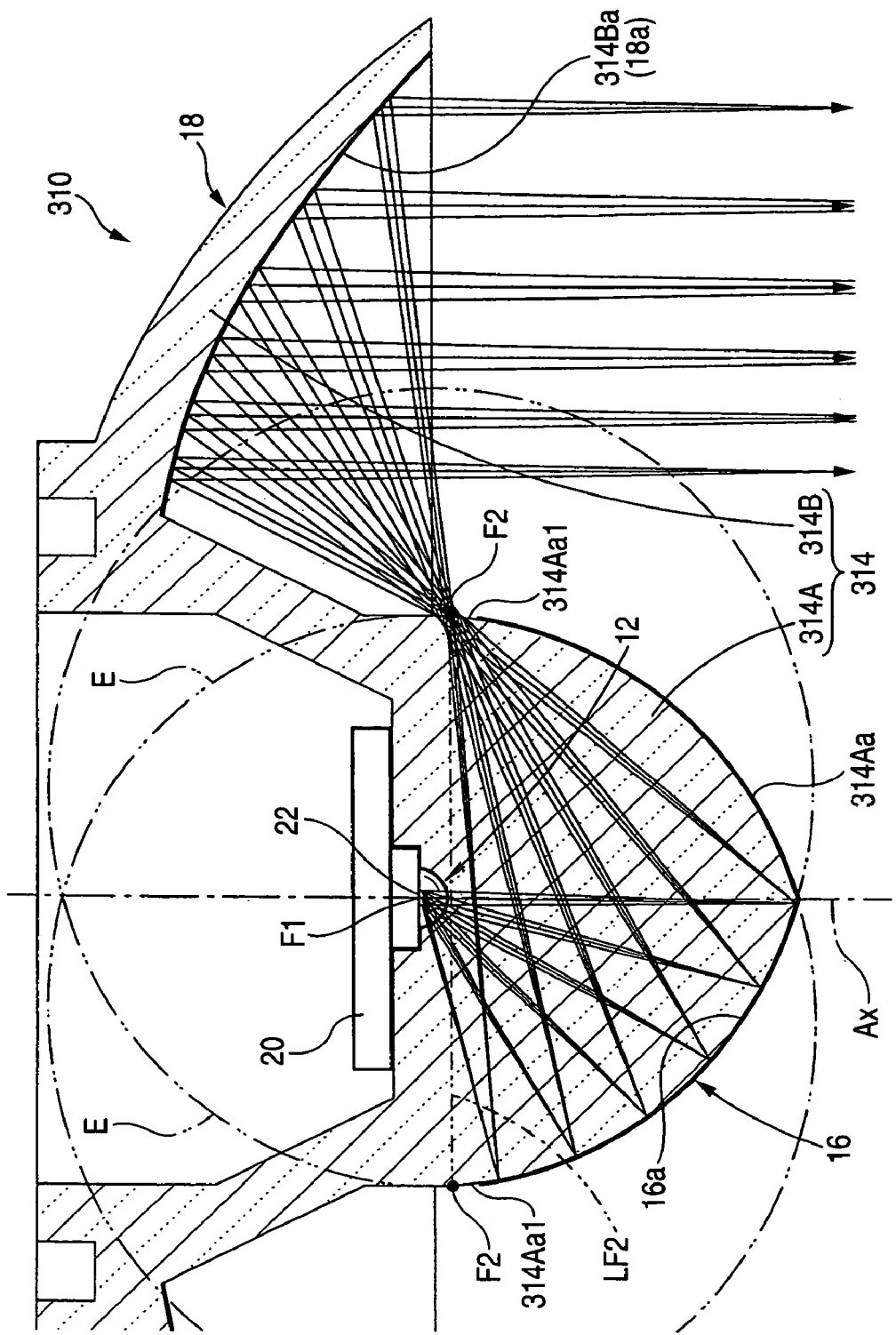
FIG. 9 is a drawing similar to FIG. 3 which shows a vehicle lighting device according to a third modification to the embodiment.

FIG. 9 is a drawing similar to FIG. 3 which shows a vehicle lighting device 310 according to a third modification to the exemplary embodiment.

As shown in the same figure, this vehicle lighting device 310 is also similar to the aforesaid embodiment in that the vehicle lighting device 310 includes a light emitting element 12 and a light translucent block 314, but the configuration of the light translucent block 314 differs from the exemplary embodiment.

Namely, in the light translucent block 314 of this modification, the function of a secondary reflector 318 of a circumferential edge block 314B thereof is designed to be performed by virtue of a surface reflection on a front surface 314Ba of the circumferential edge block 314B.

To realize this, similar to the rear surface 14Bb of the circumferential edge block 14B of the aforesaid embodiment, the front surface 314Ba of the circumferential edge block 314B has the shape of a body of revolution formed by rotating about the optical axis Ax a parabola which adopts the secondary focal point F2 of the ellipse E as a focal point and an axis parallel to the optical axis Ax as an axis thereof. Then, a planishing treatment is applied to the front surface 314Ba of the circumferential edge block 314B by virtue of aluminum deposition, whereby a reflecting surface 18a of the secondary reflector 18 is formed.

On the other hand, while a central block 314A of the light translucent block 314 has a similar configuration to that of the central block 14A of the aforesaid embodiment, the third modification is different from the aforesaid embodiment in that a rear end edge of a front surface 314Aa is situated slightly further rearwards than a secondary focal point F2 and no planishing treatment is applied to a belt-shaped region which straddles a ring-shaped locus LF2 on the front surface 314Aa, whereby the light translucent portion 314Aa1 is configured. Note that a region which is situated further rearwards than the light translucent portion 314Aa1 on the front surface 314Aa is formed into a cylindrical shape in order to facilitate the molding of the central block 314A.

In this modification, since the light translucent portion 314Aa1 is situated at an interface between the light translucent block 314A and a peripheral space, light from the light translucent device 12 that is reflected on a reflecting surface 16a of a primary reflector 16 is firstly caused to temporarily converge on the secondary focal point F2 in each cross-section of the body of revolution including the optical axis Ax, is thereafter refracted to the rear of the lighting device at the light translucent portion 314Aa and is then incident on the reflecting surface 18a of the secondary reflector 18. Then, reflected light from the reflecting surface 18a is emitted as it is to the front of the lighting device as light parallel to the optical axis Ax. As this occurs, light from a light emitting chip 22 that is reflected on the reflecting surface 16a of the primary reflector 16 is incident on the reflecting surface 18a of the secondary reflector 18 as a bundle of rays which spreads to some extent relative to light from the light emitting center thereof. Then, the bundle of rays that is reflected on the reflecting surface 18a of the secondary reflector 18 becomes a bundle or rays which is caused to converge slightly relative to light from the light emitting center of the light emitting chip 22.

In this modification, there occurs no case where reflected light from the reflecting surface 18a of the secondary reflector 18 is refracted at the front surface 314Ba of the circumferential edge block 314B, which was the case with the aforesaid embodiment, and since the light incident position on the reflecting surface 18a of the secondary reflector 18 is changed to a position that is closer to the optical axis Ax than the aforesaid exemplary embodiment, a reflected bundle of rays from the reflecting surface 18a becomes a bundle of rays which spreads slightly wider than that of the aforesaid exemplary embodiment.

Figure 10:
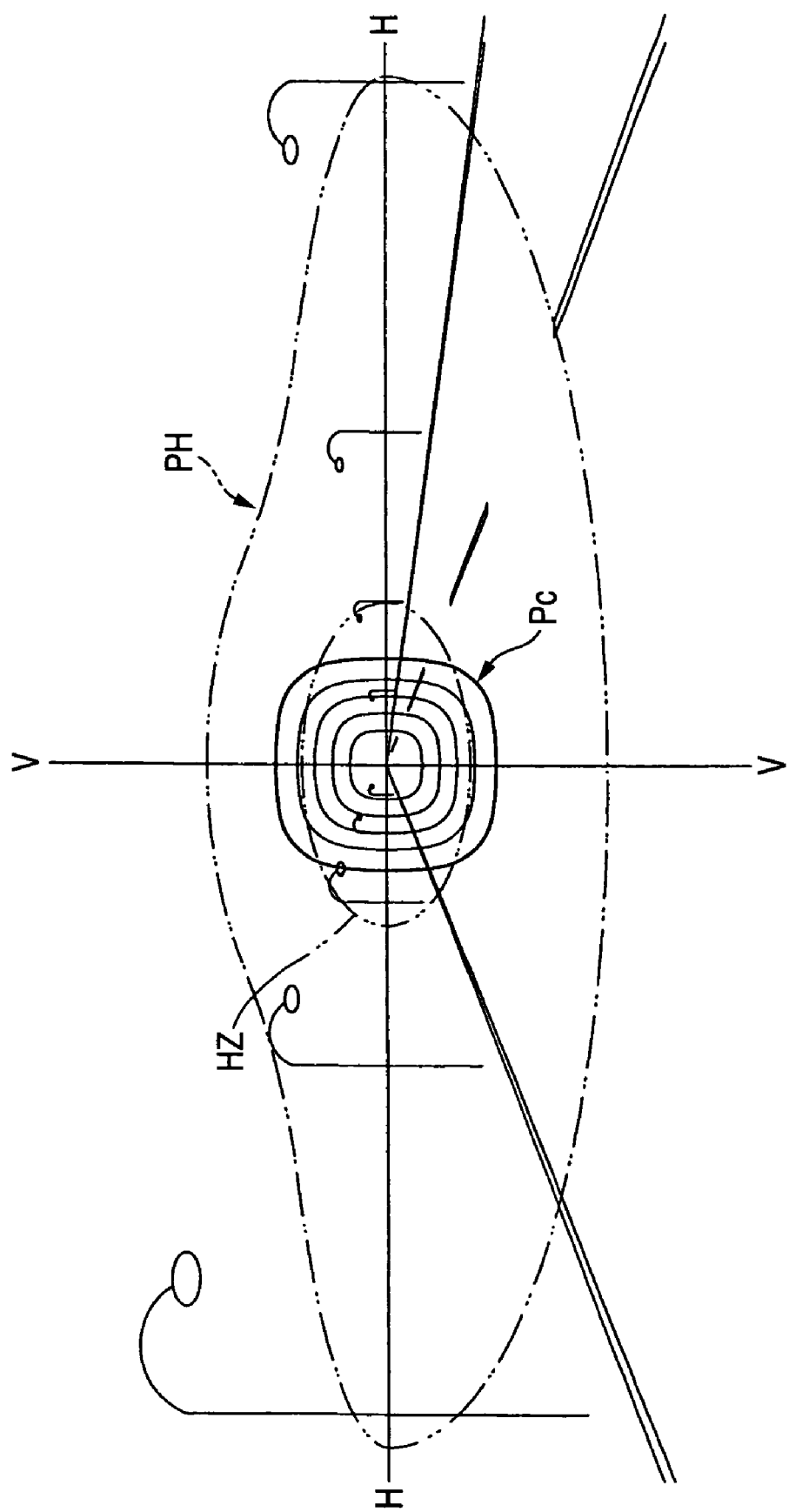
FIG. 10 is a perspective view which shows a light distribution pattern that is to be formed on the imaginary vertical screen by light emitted forwards from the vehicle lighting device according to the third modification.

FIG. 10 is a perspective view which shows a light distribution pattern Pc that is to be formed on the imaginary vertical screen disposed 25 m ahead of the vehicle by light emitted forwards from the vehicle lighting device 310.

As shown in the same figure, this light distribution pattern Pc is also formed as part of a upper beam light distribution pattern PH indicated by a chain double-dashed line in the figure.

While this light distribution pattern Pc is a spot-shaped light distribution pattern formed around an H-V point as a center thereof, the light distribution pattern so formed constitutes a light distribution pattern which is slightly larger than the light distribution pattern Pa of the aforesaid exemplary embodiment. This is because the reflected bundle of rays from the reflecting surface 18a of the secondary reflector 2 spreads slightly wider than that of the aforesaid exemplary embodiment.

Since this also constitutes the spot-shaped light distribution pattern, the light distribution pattern Pc is suitable for formation of a hot zone HZ for the upper beam light distribution pattern PH.

Also in the event that the configuration of the third modification is adopted, in addition to enhancing the utilization factor of a bundle of light from the light emitting element 12, the control of light emitted from the vehicle lighting device 310 can be implemented with good accuracy.

In addition, since the reflecting surface 16a of the primary reflector 16 and the reflecting surface 18a of the secondary reflector 18 are both made to face to the front of the lighting device, the planishing treatment thereto can be implemented with good efficiency.

Next, a fourth modification to the embodiment will be described.

Figure 11:
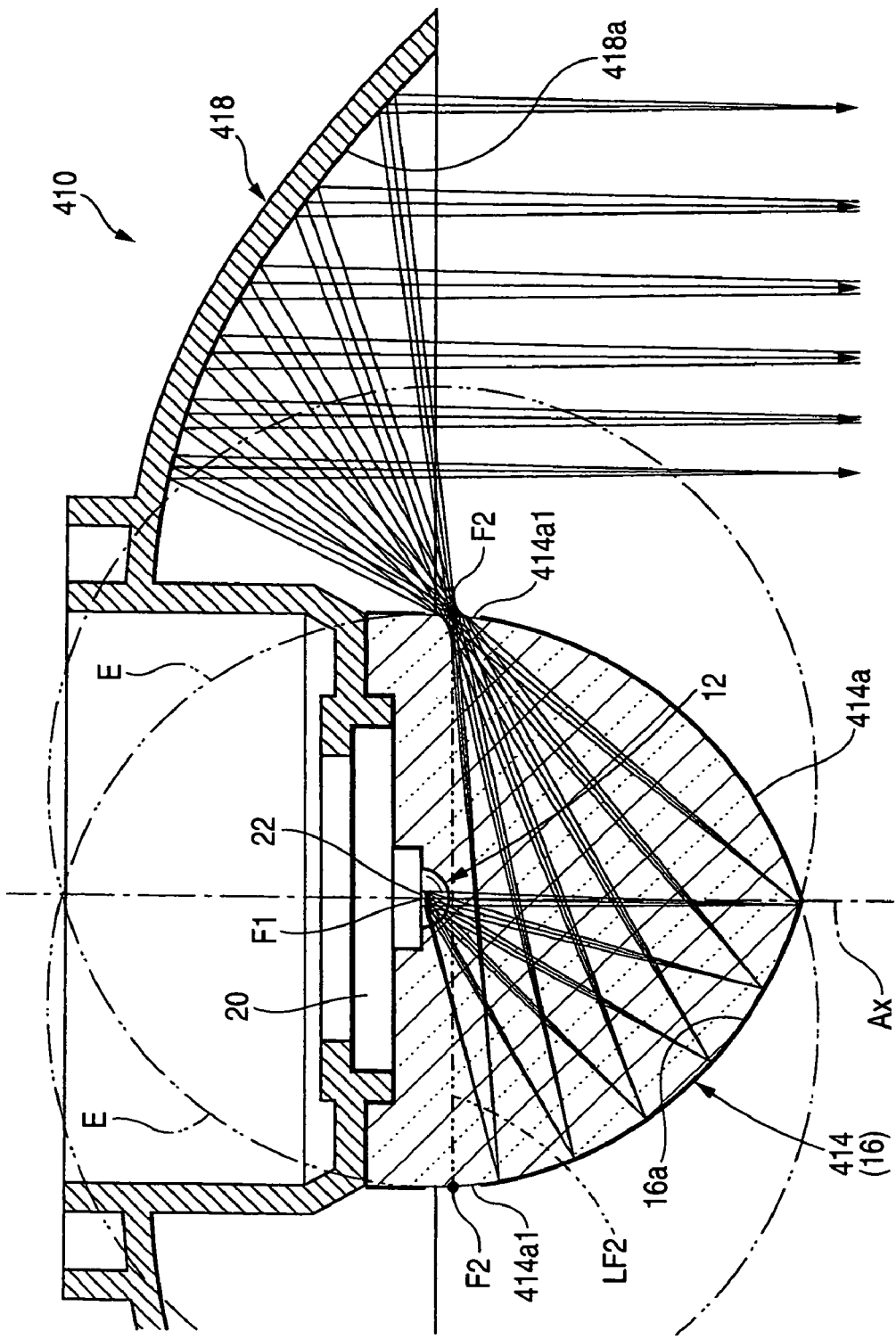
FIG. 11 is a drawing similar to FIG. 3 which shows a vehicle lighting device according to a fourth modification to the embodiment.

FIG. 11, which is a similar drawing to FIG. 3, shows a vehicle lighting device 410 according to the fourth modification.

As shown in the same figure, the vehicle lighting device 40 includes a light emitting element 12, a light translucent block 414 and a secondary reflector 418.

The light translucent block 414 has a substantially similar configuration to what results in the light translucent block 314 of the third modification in which only the central block 314A is left after the circumferential edge block 314B is cut off.

Namely, a rear end edge of a front surface 414a of the light translucent block 414 is situated slightly further rearwards than a secondary focal point F2, and no planishing treatment is applied to a belt-shaped region which straddles a ring-shaped locus LF2 on the front surface 414a, whereby a light translucent portion 414a1 is configured. Furthermore, a region which is situated further rearwards than the light translucent portion 414a1 on the front surface 414a is formed into a cylindrical shape in order to facilitate the molding of the light translucent block 414.

On the other hand, a secondary reflector 418 is made of a non-light-translucent member, and a reflecting surface 418a is formed on a front surface thereof. This reflecting surface 418a has, as with the reflecting surface 18a of the secondary reflector 18 of the third modification, the shape of a body of revolution formed by rotating about the optical axis Ax a parabola which adopts the secondary focal point F2 of the ellipse E as a focal point and an axis parallel to the optical axis Ax as an axis thereof.

The vehicle lighting device 410 according to this modification is optically substantially equivalent to the vehicle lighting device 310 according to the third modification. Consequently, a light distribution pattern Pc like one shown in FIG. 10 is to be formed by light emitted forwards from the vehicle lighting device 410 on the imaginary vertical screen disposed 25 m ahead of the vehicle.

Also in the event that the configuration of the modification is adopted, in addition to enhancing the utilization factor of a bundle of rays of light emitted from the light emitting element 12, the control of light emitted from the vehicle lighting device 410 can be implemented with good accuracy.

In addition, in the fourth modification, the molding of the light translucent block 414, which makes up of the primary reflector 16, can be facilitated by providing the primary reflector 16 and the secondary reflector 418 separately from each other.

Next, a fifth modification to the aforesaid embodiment will be described.

Figure 12:
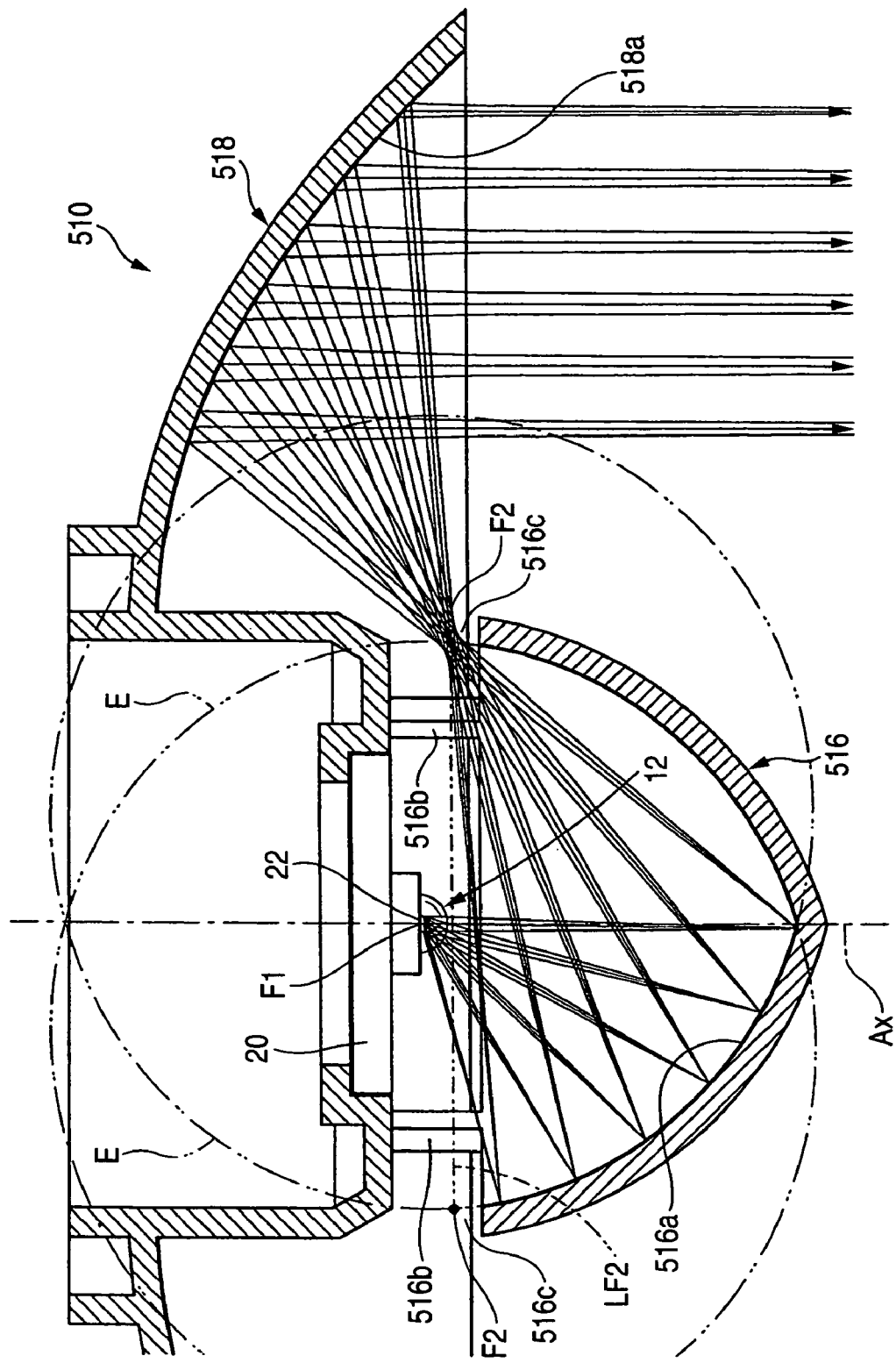
FIG. 12 is a drawing similar to FIG. 3 which shows a vehicle lighting device according to a fifth modification to the embodiment.

FIG. 12 is a drawing similar to FIG. 3 which shows a vehicle lighting device 510 according to this modification.

As shown in the same figure, this automotive illumination lam 510 includes a light emitting element 12, a primary reflector 516 and a secondary reflector 518.

As with the secondary reflector 418 of the fourth modification, the secondary reflector 518 is made of a non-light-translucent member, and a reflecting surface 518a has a similar surface shape to that of the reflecting surface 418a of the secondary reflector 418 of the fourth modification. In this modification, the light emitting element 12 is designed to be supported by the secondary reflector 518 via a support plate 20.

On the other hand, the primary reflector 516 is also made of a non-light-translucent member, and a reflecting surface 518a is formed on an internal surface thereof.

The surface shape of the reflecting surface 516a of the primary reflector 516 is completely similar to the surface shape of the reflecting surface 16a of the primary reflector 16 of the fourth modification, and a rear end edge of the reflecting surface 516a is situated slightly further forwards than a secondary focal point F2. Then, the primary reflector 516 is fixedly support on the secondary reflector 518 via a plurality of pillars 516b which extend rearwards from the position of the rear end edge of the reflecting surface 516a thereof. Then, in this primary reflector 516, a belt-shaped region which straddles a ring-shaped locus LF2 resulting when the secondary focal point F2 of the ellipse E is rotated about the optical axis Ax constitutes a light translucent portion 516c which functions as a gap between the primary reflector 516 and the secondary reflector 518. Note that this light translucent portion 516 is partially interrupted by the plurality of pillars 516b.

While the vehicle lighting device 510 according to this modification is optically substantially equivalent to the vehicle lighting device 10 according to the aforesaid exemplary embodiment after light from the light emitting element 12 is reflected on the reflecting surface 516a of the primary reflector 516 until the light so reflected is then reflected on the reflecting surface 518a of the secondary reflector 518, the reflected light from the reflecting surface 518a of the secondary reflector 518 is emitted as it is to the front of the lighting device without being refracted at the front surface 14Ba of the circumferential edge block 14 as occurring with the aforesaid embodiment.

Figure 13:
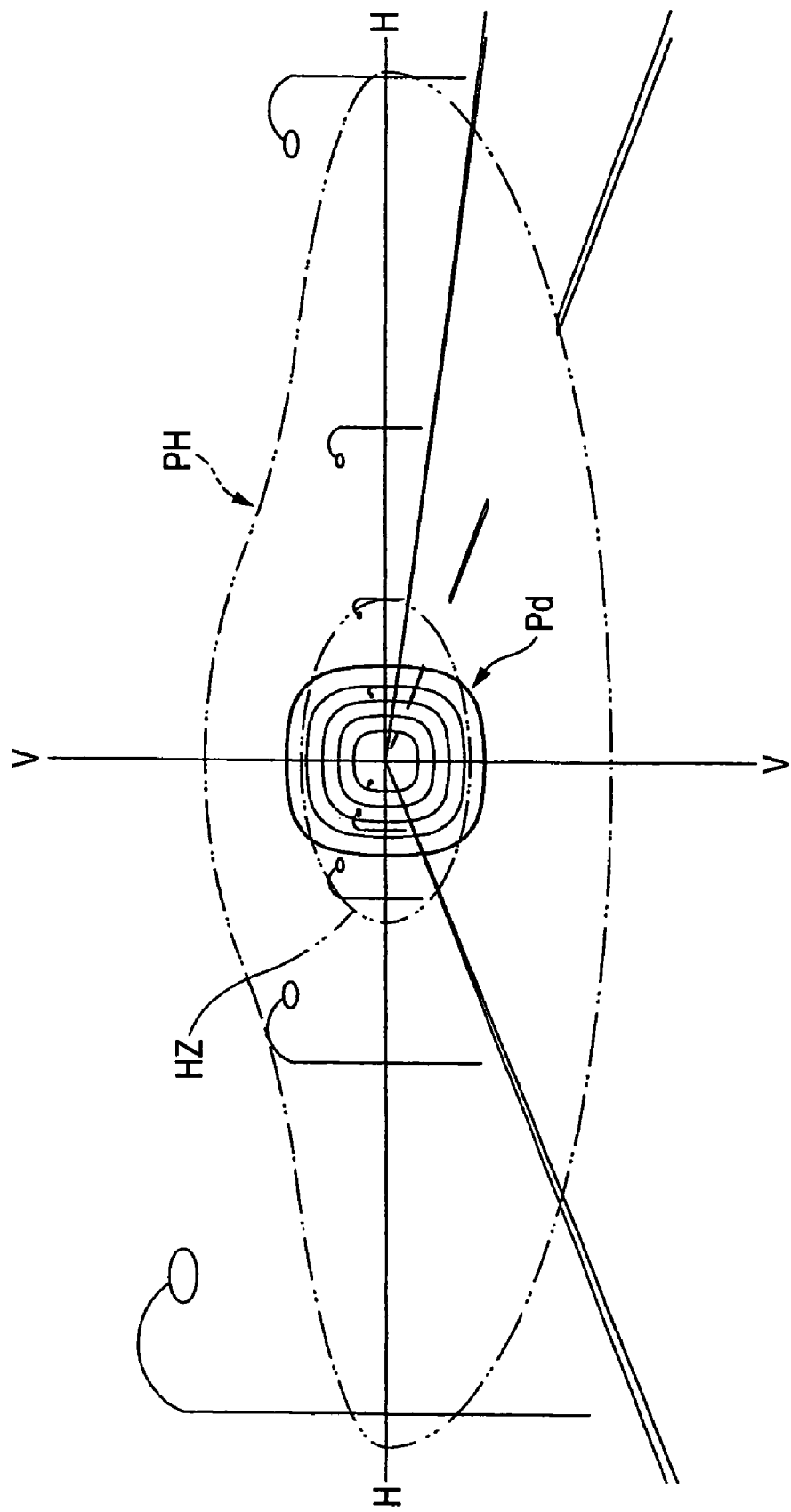
FIG. 13 is a perspective view which shows a light distribution pattern that is to be formed on the imaginary vertical screen by light emitted forwards from the vehicle lighting device according to the fifth modification.

FIG. 13 is a perspective view which shows a light distribution pattern Pd that is to be formed by light emitted forwards from the vehicle lighting device 510 on the imaginary vertical screen disposed 25 m ahead of the vehicle.

As shown in the same figure, this light distribution pattern Pd is also formed as part of a upper beam light distribution pattern PH indicated by a chain double-dashed line in the figure.

While the light distribution pattern Pd is a spot-shaped light distribution pattern formed around an H-V point as a center thereof, the light distribution pattern Pd constitutes a light distribution pattern which is slightly larger than the light distribution pattern Pa of the aforesaid embodiment but is slightly smaller than the light distribution pattern Pc of the fourth modification. The reason why the light distribution pattern Pd is slightly larger than the light distribution pattern Pa of the aforesaid embodiment is because there is provided no refracting action like one which occurs at the front surface 14ba of the circumferential edge block 14B in the aforesaid embodiment, and the reason why the light distribution pattern Pd is slightly smaller than the light distribution Pc of the fourth modification is because there is provided no refracting action to the rear of the lighting device like one which occurs at the light translucent portion 314a of the central block 314A in the fourth modification.

Since this is also formed into the spot-shaped light distribution pattern, the light distribution pattern Pd is suitable for the formation of a hot zone HZ for the upper beam light distribution pattern PH.

Also in the event that the configuration of this modification is adopted, the control of light emitted from the vehicle lighting device 510 can be implemented with good accuracy on top of enhancing the utilization factor of a bundle of rays of light from the light emitting element 12.

In addition, the heat dissipating property for heat generated by the light emitting element 12 can be enhanced by configuring the vehicle lighting device 510 without using a light translucent block as in the case with this modification.

Next, a sixth modification to the aforesaid embodiment will be described.

Figure 14:
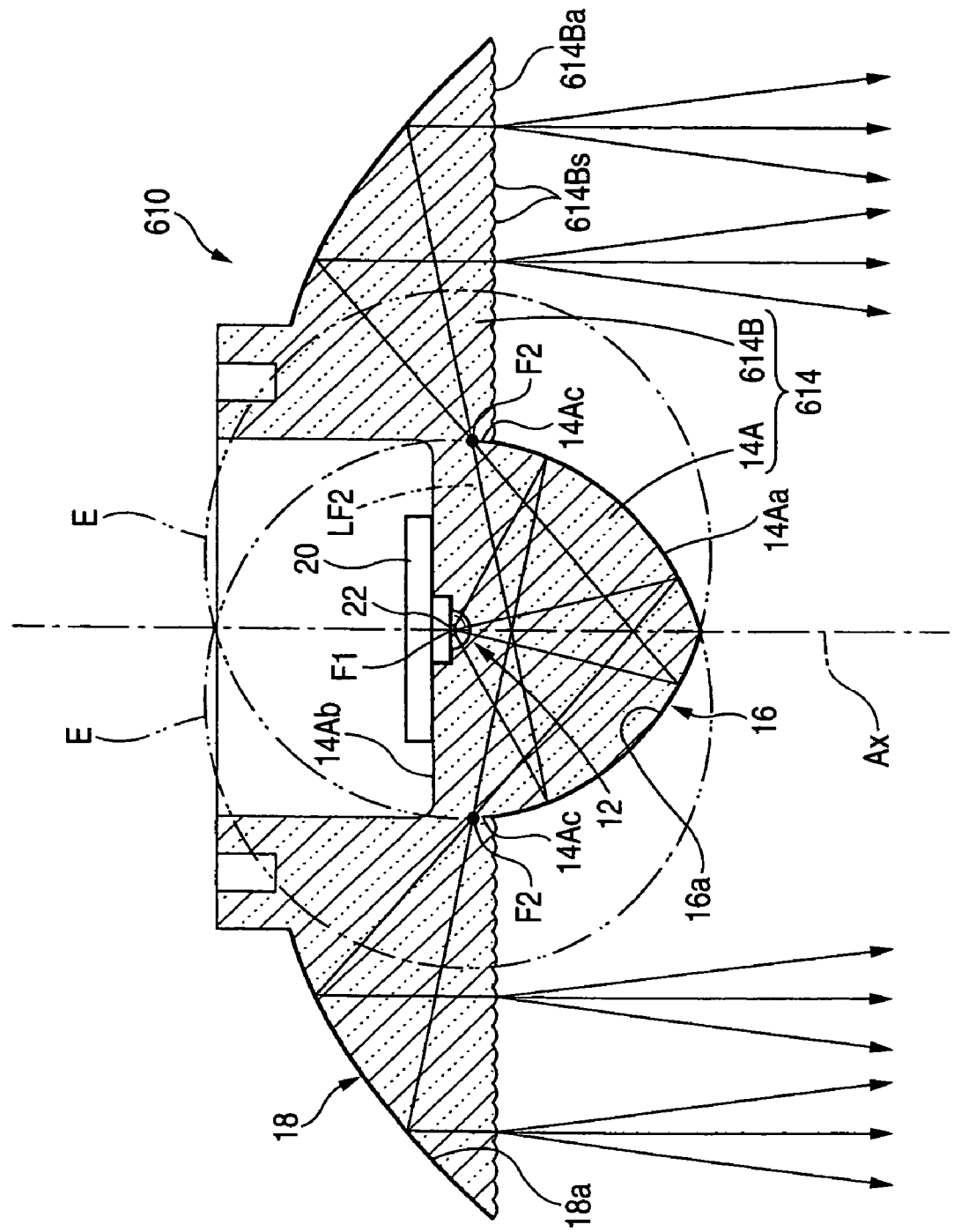
FIG. 14 is a drawing similar to FIG. 2 which shows a vehicle lighting device according to a sixth modification to the embodiment.

FIG. 14 is a drawing similar to FIG. 2 which shows a vehicle lighting device 610 according to this modification.

As shown in the same figure, this modification is similar to the aforesaid embodiment in that the vehicle lighting device 610 also includes a light emitting element 12 and a light translucent block 614 but is different therefrom in that the configuration of a circumferential edge block 614B of the light translucent block 614 differs partially from that of the corresponding member of the aforesaid exemplary embodiment.

Namely, in the circumferential edge block 614B of the modification, a plurality of diverging lens elements 614Bs are formed in vertical stripes on a front surface 614Ba thereof. Accordingly, when light from the light emitting element 12 that reaches a front surface 614Ba of the circumferential edge block 614B by way of a reflecting surface 16a of a primary reflector 16 and a reflecting surface 18a of a secondary reflector 18 is emitted from the front surface 614Ba towards the front of the lighting device, the light so emitted is designed to diverge in a transverse direction by means of the plurality of diverging lens elements 614Bs.

Figure 15:
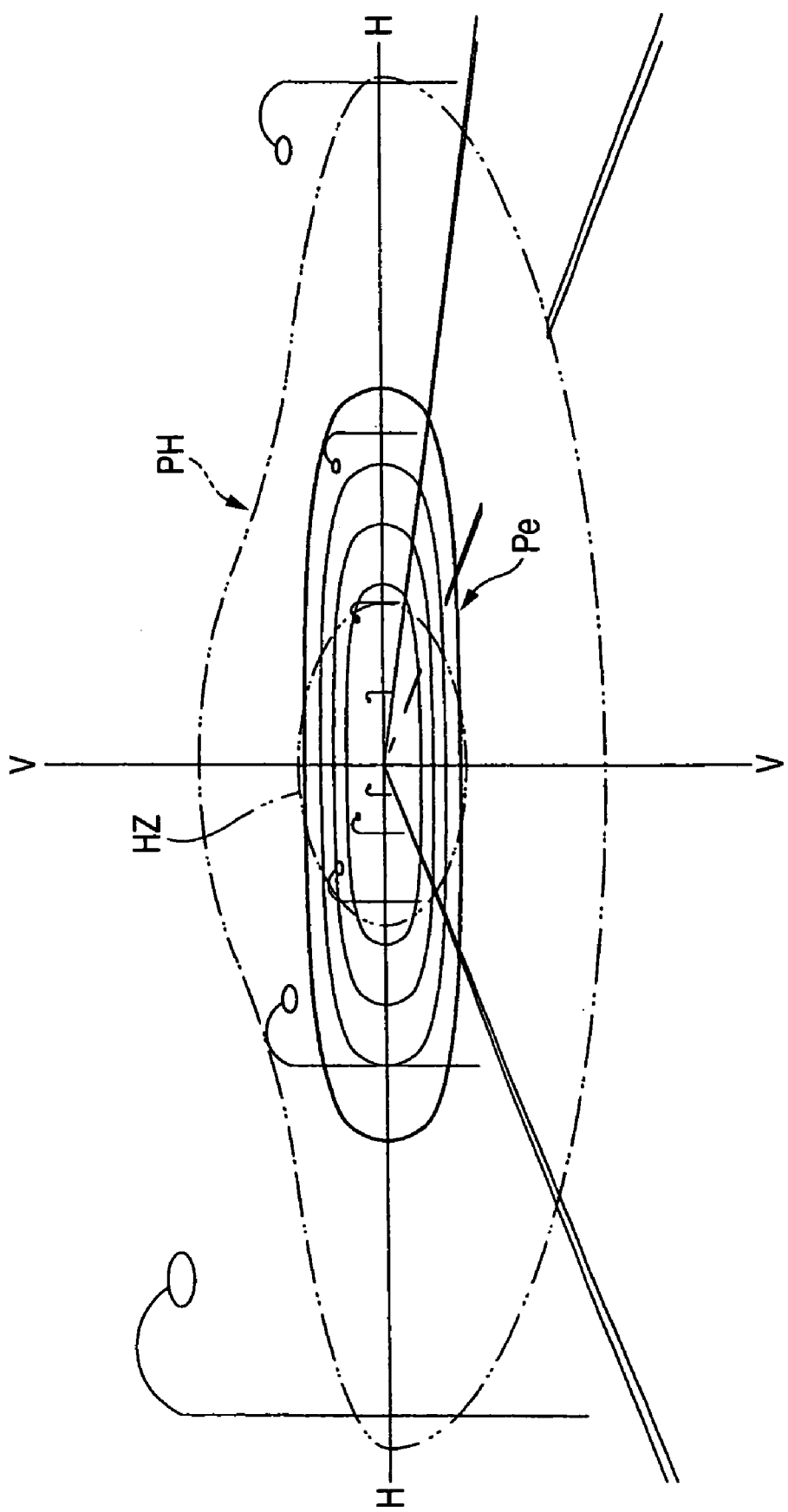
FIG. 15 is a perspective view which shows a light distribution pattern that is to be formed on the imaginary vertical screen by light emitted forwards from the vehicle lighting device according to the sixth modification.

FIG. 15 is a perspective view which shows a light distribution pattern Pe which is to be formed by light transmitted forwards from the vehicle lighting device 610 on the imaginary vertical screen disposed 25 m ahead of the vehicle.

As shown in the same figure, this light distribution pattern Pe is also to be formed as part of a upper beam light distribution pattern indicated by a chain double-dashed line in the same figure.

This light distribution pattern Pe constitutes a transversely elongated light distribution pattern resulting when the light distribution pattern Pa of the aforesaid embodiment is stretched transversely.

Since this constitutes the transversely elongated light distribution pattern, the light distribution pattern Pe is suitable for reinforcement the brightness on left and right sides of a hot zone HZ of the upper beam light distribution pattern PH.

Also in the event that the configuration of this modification is adopted, the control of light emitted from the vehicle lighting device 610 can be implemented with good accuracy on top of enhancing the utilization factor of a bundle of rays of light from the light emitting element 12.

In addition, by adopting the vehicle lighting device 610 that is configured so as to form the transversely elongated light distribution pattern Pe as in the case with this modification, not only can the vehicle lighting device 610 be used as part of a headlamp but also the vehicle lighting device 610 can be used as lamps other than the headlamp such as a cornering lamp or the like. As this occurs, the vehicle lighting device 610 can also be used in such a state as to be directed in a direction inclined transversely outwards at a predetermined angle relative to the longitudinal direction of the vehicle, and in this case, the vehicle lighting device 610 can be made more suitable for a cornering lamp or the like.

Next, a seventh modification to the aforesaid exemplary embodiment will be described.

Figure 16:
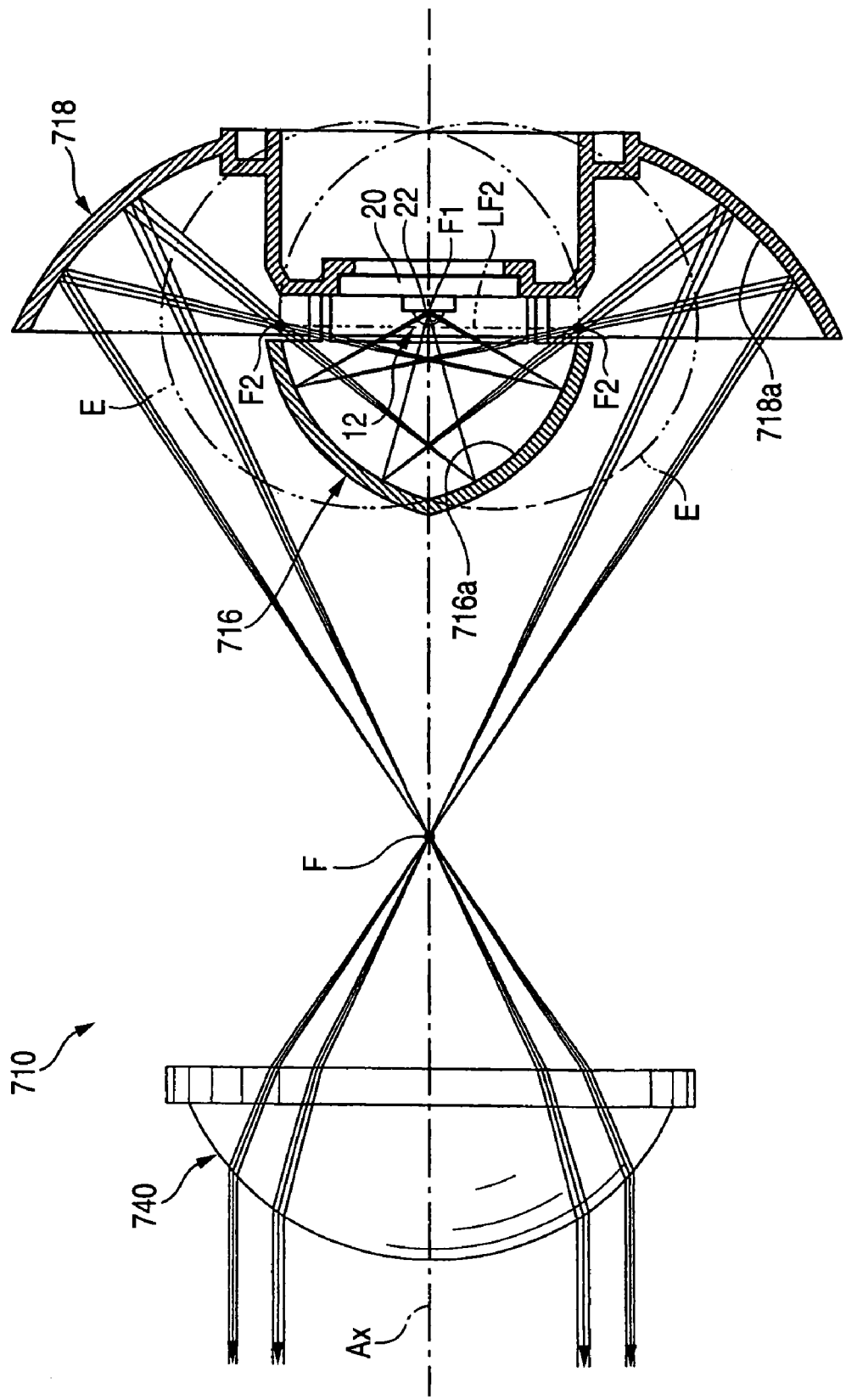
FIG. 16 is a drawing similar to FIG. 2 which shows a vehicle lighting device according to a seventh modification to the embodiment.

FIG. 16 is a drawing similar to FIG. 2 which shows a vehicle lighting device 710 according to this modification.

As shown in the same figure, the vehicle lighting device 710 includes a light emitting element 12, a primary reflector 716, a secondary reflector 718 and a projecting lens 740.

The projecting lens 740 is made up of a plano-convex lens which has a convex plane on a front side and a flat plane on a rear side thereof and is disposed at a position a predetermined distance further forwards than the primary reflector 716 on the optical axis Ax. Then, this projecting lens 740 is designed to project an image on a focal plane including a rear focal point F forwards as an inverted image.

While the basic configurations of the primary and secondary reflectors 716, 718 are similar to the primary and secondary reflectors 516, 518 of the fifth modification, the surface shape of a reflecting surface 718*a* of the secondary reflector 718 is different from that of the fifth modification.

Namely, the reflecting surface 718*a* of the secondary reflector 718 has the shape of a body of revolution formed by rotating about the optical axis Ax an ellipse which adopts the secondary focal point F2 of the ellipse E as a primary focal point and the rear focal point F of the projecting lens 740 as a secondary focal point thereof, whereby the reflecting surface 718*a* is adapted to cause light from the light emitting element 12 that is reflected on the reflecting surface 716*a* of the primary reflector 716 to converge on the rear focal point F of the projecting lens 740.

Note that the projecting lens 740 is fixedly supported on the secondary reflector 718 via a bracket (not shown), or the like.

Figure 17:
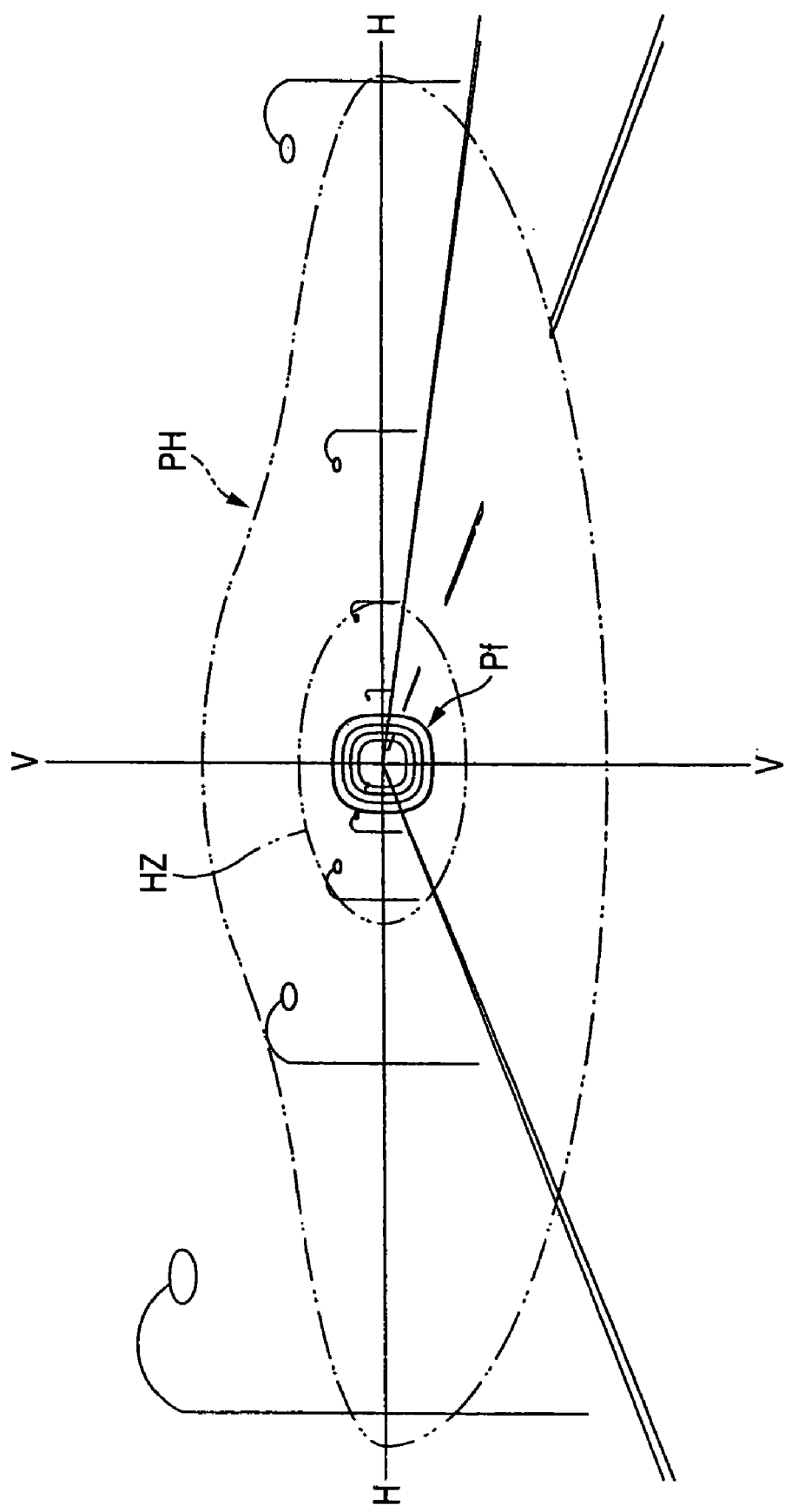
FIG. 17 is a perspective view which shows a light distribution pattern that is to be formed on the imaginary vertical screen by light emitted forwards from the vehicle lighting device according to the seventh modification.

FIG. 17 is a perspective view of a light distribution pattern Pf that is to be formed by light emitted forwards from the vehicle lighting device 710 on the imaginary vertical screen disposed 25 m ahead of the vehicle.

As shown in the same figure, this light distribution pattern Pf is also to be formed as part of an upper beam light distribution pattern PH indicated by a chain double-dashed line in the figure.

While this light distribution pattern Pf is a spot-shaped light distribution pattern formed around an H-V point as a center thereof, the light distribution pattern Pf constitutes a light distribution pattern which is much smaller than the light distribution pattern Pa of the aforesaid exemplary embodiment. The reason for this will be described below.

Namely, while light from the light emitting element 12 that is reflected on the reflecting surface 716*a* of the primary reflector 716 and the reflecting surface 718*a* of the secondary reflector 718 converges on the rear focal point F of the projecting lens 740, as this occurs, since light from respective positions on a light emitting chip 22 constitutes a bundle of rays which converges slightly relative to light from a light emitting center of the light emitting chip 22, an image of the light emitting chip 22 that is formed on a focal plane at the rear focal point F of the projecting lens 740 becomes sufficiently small. Consequently, an inversely projected image formed on the imaginary vertical screen by the projecting lens 740 also becomes sufficiently small, whereby a rather small light distribution pattern Pf is formed.

Since this light distribution pattern Pf also constitutes a spot-shaped light distribution pattern, the light distribution pattern Pf is also suitable for the formation of a hot zone HZ for the upper beam light distribution pattern PH.

Also in the event that the configuration of this modification is adopted, in addition to enhancing the utilization factor of a bundle of rays of light emitted from the light emitting element 12, the control of light emitted from the vehicle lighting device 710 can be implemented with good accuracy.

In addition, by forming the small light distribution pattern Pf as in the case with this modification, it becomes easy to increase the central luminous intensity of the hot zone HZ.

While the invention has been described with reference to the exemplary embodiment and modifications thereof, the technical scope of the invention is not restricted to the description of the exemplary embodiment and modifications thereof. It is apparent to the skilled in the art that various changes or improvements can be made. It is apparent from the description of claims that the changed or improved configurations can also be included in the technical scope of the invention.

What is claimed is:

1. A vehicle lighting device, comprising:
    a light emitting element disposed such that an optical axis of the light emitting element extends in a longitudinal direction of the lighting device in such a manner as to be directed to the front of the lighting device,
    a primary reflector for reflecting light from the light emitting element towards the rear of the lighting device, and
    a secondary reflector for reflecting the light from the light emitting element that is reflected on the primary reflector to the front of the lighting device, wherein
    a reflecting surface of the primary reflector has a shape of a substantially dome-shaped body of revolution that is formed by rotating an ellipse about the optical axis, the ellipse having a primary focal point which is a point near the light emitting element and a secondary focal point which is a point near the reflecting surface, and wherein
    the primary reflector includes a belt-shaped region that is a light translucent portion, the belt-shaped region straddles a ring-shaped locus, which is formed by the secondary focal points of the ellipse rotated about the optical axis.

2. The vehicle lighting device as set forth in claim 1, wherein the primary reflector is made up of a light translucent block in which a predetermined region on a surface of the primary reflector is configured as a reflecting surface, so that light from the light emitting element that is incident on the light translucent block is internally reflected on the reflecting surface.

3. The vehicle lighting device as set forth in claim 2, wherein a region on a surface of the light translucent block which has a predetermined range defined around the optical axis as a center thereof is configured as a direct light emitting surface from which light from the light emitting element that is incident on the light translucent block is emitted directly towards the front of the lighting device.

4. The vehicle lighting device as set forth in claim 2, wherein the secondary reflector is formed integrally with the primary reflector by the light translucent block which makes up the primary reflector, and wherein
    the ring-shaped locus of the secondary focal point lies in the interior of the light translucent block.

5. The vehicle lighting device as set forth in claim 3, wherein the secondary reflector is formed integrally with the primary reflector by the light translucent block which makes up the primary reflector, and wherein
    the ring-shaped locus of the secondary focal point lies in the interior of the light translucent block.

6. The vehicle lighting device as set forth in claim 1, wherein a reflecting surface of the secondary reflector has a shape of a body of revolution formed by rotating about the optical axis a parabola, which includes the secondary focal point as a focal point.

* * * * *